United States Patent [19]

Nyberg

[11] Patent Number: 5,788,826
[45] Date of Patent: Aug. 4, 1998

[54] ELECTROCHEMICALLY ASSISTED ION EXCHANGE

[75] Inventor: Eric D. Nyberg, Belmont, Calif.

[73] Assignee: Pionetics Corporation, Mountain View, Calif.

[21] Appl. No.: 790,710

[22] Filed: Jan. 28, 1997

[51] Int. Cl.[6] .......................... B01D 61/44; B01D 61/46
[52] U.S. Cl. .......................... 204/536; 204/537; 204/538; 204/631; 204/632
[58] Field of Search ........................ 204/536, 537, 204/538, 631, 632

[56] References Cited

U.S. PATENT DOCUMENTS

| | | | |
|---|---|---|---|
| 2,829,095 | 4/1958 | Oda et al. | 204/98 |
| 3,645,884 | 2/1972 | Gilliland | 204/301 |
| 3,654,125 | 4/1972 | Leitz et al. | 204/301 |
| 4,024,043 | 5/1977 | Dege et al. | 204/296 |
| 4,032,452 | 6/1977 | Davis | 210/243 |
| 4,107,015 | 8/1978 | Chlanda et al. | 204/180 |
| 4,225,412 | 9/1980 | Reiss | 204/631 |
| 4,284,492 | 8/1981 | Karn | 204/631 |
| 4,465,573 | 8/1984 | O'Hare | 204/180 P |
| 4,871,431 | 10/1989 | Parsi | 204/631 |
| 4,888,098 | 12/1989 | Nyberg et al. | 204/1 R |
| 5,007,989 | 4/1991 | Nyberg et al. | 204/1.11 |
| 5,019,235 | 5/1991 | Nyberg et al. | 204/282 |
| 5,227,040 | 7/1993 | Simons | 204/621 |

OTHER PUBLICATIONS

*Webster's Ninth New Collegiate Dictionary*, © 1991 by Merriam–Webster Inc., p. 283.

*Primary Examiner*—Arun S. Phasge
*Attorney, Agent, or Firm*—Ashok K. Janah

[57] ABSTRACT

A electrochemical cell for removing ions from a solution stream comprises a housing having first and second electrodes. At least one water-splitting ion exchange membrane is positioned between the electrodes, the water-splitting membrane comprising (i) a cation exchange surface facing the first electrode, and (ii) an anion exchange surface facing the second electrode. A solution stream pathway is defined by the water-splitting membrane. The solution stream pathway comprises (i) an inlet for influent solution stream, (ii) at least one channel that allows influent solution stream to flow past at least one surface of the water-splitting membrane to form one or more treated solution streams, and (iii) a single outlet that combines the treated solution streams to form a single effluent solution. Preferably, the solution stream pathway comprises a unitary and contiguous channel that flows past both the cation and anion exchange surfaces of the water-splitting membrane, and more preferably is connected throughout in an unbroken sequence and extends substantially continuously from the inlet to the outlet.

57 Claims, 9 Drawing Sheets

ELECTROCHEMICALLY ASSISTED ION EXCHANGE

BACKGROUND

This invention relates to the field of ion exchange, and in particular, to the use of ion exchange membranes in electrochemical cells.

Ion exchange materials are used to remove or replace ions in solutions, for example in the production of high purity water by deionization, in waste water treatment (the extraction of copper ions from industrial waste streams), and in selective substitution of ions in solution (e.g., water softening processes in which "hard" divalent ions, such as calcium, are replaced by "soft" sodium or potassium ions). Ion exchange materials are typically divided into two categories, namely cation exchange and anion exchange, both types generally being solids or gels which comprise replaceable ions, or which chemically react with specific ions to function as ion exchange materials. They may be cross-linked or uncross-linked organic polymers or inorganic structures such as zeolites. Cation exchange materials comprise acidic groups such as —COOM, —$SO_3M$, —$PO_3M_2$, and —$C_6H_4OM$, where M is a cation (e.g., hydrogen, sodium, calcium, or copper ion) that exchange cations with no permanent change to the structure of the material. Cation exchange materials are commonly subdivided into "strong acid" and "weak acid" types, terms which refer to the ion exchange group's acid strength or $pK_a$. Strong acid types such as those comprising —$SO_3M$ groups function over virtually the full range of solution acid strengths (e.g., pH=0 to 15). Weak acid types such as those comprising —COOM only serve as ion exchange materials when the pH is near or above the acid group's $pKa_a$. Cation exchange materials also include those comprising neutral groups or ligands that bind cations through coordinate rather than electrostatic or ionic bonds. For example, a pyridine group affixed to a polymer will form a coordinate bond to $Cu^{+2}$ ion to remove it from solution. Other cation exchange materials include polymers comprising complexing or chelating groups (e.g., those derived from aminophosphoric acid, aminocarboxylic acid, and hydroxamic acid).

Anion exchange materials exchange anions with no permanent change to the structure of the material, and comprise basic groups such as —$NR_3A$, $NR_2HA$, —$PR_3A$, —$SR_2A$, or $C_5H_5NHA$ (pyridinium), where R is typically an aliphatic or aromatic hydrocarbon group and A is an anion (e.g., hydroxide, bicarbonate or sulfonate). Anion exchange materials are commonly subdivided into "strong base" and "weak base" types. Weak base resins such as —$NR_2HA$ and $C_5H_5NHA$ exchange anions only when the solution pH is near or below the basic group's $pK_a$, while strong base resins such as —$NR_3A$ function over a much wider range of solution pH values.

Ion exchange materials are useful in several forms, for example small or large spheres or beads, powders produced by pulverization of beads, and membranes. The simplest ion exchange membranes are monopolar membranes which comprise substantially only one of the two types of ion exchange materials: either cation or anion exchange materials. Another type of membrane is the water-splitting membrane, also known as bipolar, double, or laminar membranes. Water-splitting membranes are structures comprising a strong-acid cation exchange surface or layer (sulfonate groups; —$SO_3M$) and a strong-base anion exchange surface or layer (quaternary ammonium groups; —$NR_3A$) in combination such that in a sufficiently high electric field produced by application of voltage to two electrodes, water is irreversibly dissociated or "split" into its component ions $H^+$ and $OH^-$. The dissociation of water occurs most efficiently at the boundary between the cation and anion exchange layers in the water-splitting membrane, and the resultant $H^+$ and $OH^-$ ions migrate through the ion exchange layers in the direction of the electrode having an opposite polarity (e.g., $H^+$ migrates toward the negative electrode).

Conventional ion exchange is a batch process typically employing ion exchange resin beads packed into columns. A single stream of solution to be treated (source solution) is passed through a column or channel. Ions in the solution are removed or replaced by the ion exchange material, and product solution or water emerges from the outlet of the column. When the ion exchange material is saturated with ions obtained from the source solution (e.g., its capacity is consumed or "exhausted"), the beads are regenerated with a suitable solution. Cation exchange resins are commonly regenerated using acidic solutions, and anion exchange resins are regenerated using basic solutions. A notable exception is the use of sodium or potassium chloride solutions to regenerate water softening columns. During regeneration, the apparatus cannot be used for creating product solution or water. Regeneration is concluded with a rinsing step which removes entrapped regenerant solution. Such batch processes are contrasted with continuous processes that employ membranes which do not require a regeneration step.

Several important benefits accrue from batch ion exchange operation for solution treatment rather than a continuous process. First, ion exchange materials are highly selective, and exclusively remove or replace ions in solution, largely ignoring neutral groups. They may also be very selective in the removal or replacement of one type of ion over other ions. For example in water softening processes, cation exchange materials comprising sulfonate groups selectively extract multivalent ions such as calcium and magnesium from solution while leaving the monovalent ion concentration (e.g., sodium) unaffected. Water softening occurs because the sulfonate group has a ten-fold greater affinity (selectivity) for divalent ions than for monovalent ions. Alternatively, a chelating cation exchange group such as iminodiacetic acid is particular suitable for selectively extracting copper ion from solutions containing other ions. This ion exchange group has an eight order-of-magnitude greater affinity for copper ion than for sodium ion. A second advantage of batch ion exchange processes is their greater resistance to fouling from either biological growths (e.g., algae) or mineral scale. Strong acids and bases are most often used to regenerate cation and anion exchange materials, respectively, creating an environment in which biological organisms cannot survive. Mineral scale forms in neutral or basic environments (pH>7) in the presence of multi-valent cations; scale typically comprises calcium and magnesium carbonates, hydroxides and sulfates. Build-up of scale on surfaces or in channels of continuous apparatus' for water treatment has a dramatic, detrimental effect on ion removal efficiencies. Formation of scale in batch ion exchange systems is a less serious problem because of the frequent regeneration of cation exchange materials (where the multivalent cations are concentrated) with strong acids which rapidly dissolve scale. A third advantage is the potential to produce concentrated regenerant effluents (containing the ions removed in the preceding solution treatment step). This is important when the ion removed by the ion exchange material is the chemical of interest and one desires its isolation (for example an amino acid or protein removed from a cell culture). The ability to produce more concentrated regenerant effluents provides the further important benefits of consuming less water and placing a smaller burden on waste treatment plants.

Although batch type ion exchange processes have important benefits, the need for regenerant chemicals renders such processes expensive and environmentally unfriendly. The environmental costs associated with the purchase, storage, handling, and disposal of used toxic or corrosive regenerant chemicals such as sulfuric acid, hydrochloric acid, and caustic soda prohibit use of this ion exchange process in many applications. Even in water softening, while the sodium or potassium chloride regenerant is much less hazardous, the need for consumers to haul 50 lb bags of salt home from the grocery store to refill their softeners every several weeks is a major inconvenience. In addition, salt-rich regeneration effluent from water softeners which is washed into the sewer can be difficult to handle in municipal waste treatment facilities. Another negative environmental impact from chemical regeneration results from the need for large quantities of water to rinse the regenerated ion exchange column and prepare it for a subsequent operating step. Water is not only scarce in many regions of the world, but the resultant large volume of dilute waste rinse water must also be treated (e.g., neutralized) before disposal.

Continuous processes that avoid regenerant chemicals for the electrochemical regeneration of ion exchange materials are disclosed in for example U.S. Pat. No. 3,645,884 (Gilliland), U.S. Pat. No. 4,032,452 (Davis), and U.S. Pat. No. 4,465,573 (O'Hare); all of which are incorporated herein by reference. In these electrodialysis systems, the ion exchange material, most often in bead form, is separated from two electrodes by a multitude of monopolar cation and anion exchange membranes; the ion exchange bead material is then continuously regenerated by an electrodialysis process in which ions migrate in an electric field through the solution, beads, and compatible monopolar membranes (i.e., cations pass through monopolar cation exchange membranes, and anions pass through monopolar anion exchange membranes), until they are prevented from further movement by incompatible monopolar membrane barriers. This property of monopolar ion exchange membranes to pass ions of one polarity while preventing passage of ions of the opposite polarity is referred to as permselectivity. Because it is a continuous process, electrodialysis is characterized by two separate, contiguous solution streams of substantially different compositions, namely a product water stream from which ions are continuously removed, and a waste water stream into which these ions are concentrated. A primary advantage of the electrodialysis process versus conventional ion exchange is its continuous operation which reduces down-time or avoids the need for a second (redundant) apparatus to operate during the regeneration of a first ion exchange column. A second important advantage is that the electrodialysis waste stream only contains the ions removed from the product water as a result of using electrical energy rather than chemical energy for removing or replacing ions. Because chemical regeneration in conventional ion exchange is a relatively slow and inefficient process, and it is important to minimize down-time, excess chemicals are typically employed. Thus the regeneration solution in batch ion exchange processes contains a considerable excess of chemicals in addition to the ions which were removed from the product water in the preceding cycle. This is a significant complicating factor if one desires to recover the previously removed ions from the regenerant (e.g., copper ion). The excess chemicals also create a still further burden on waste treatment systems.

Continuous electrodialysis water treatment processes suffer from several drawbacks. First, it is a much less selective ion removal process that is governed by mass transport rates rather than by chemical equilibria. Since electrodialysis apparatus require the use of highly conductive membranes for good electrical efficiency and high mass transport rates, there is little latitude for optimizing membranes for the property of selectivity. A second drawback is that electrodialysis apparatus are prone to mineral scale fouling that interferes with flow of liquid, migration of ions, or effectiveness of the electrodes, causing eventually plugging up of the equipment. Thus in many water deionization electrodialysis apparatus water must be softened prior to passing it through the device. Alternatively, when multivalent ions are introduced into the apparatus, the electrode polarity may be occasionally reversed as described in U.S. Pat. No. 2,863,813 (Juda), which provides an acidic environment that dissolves mineral scale. However, such polarity reversal does not substantially change the ion exchange capacity of the membranes or ion exchange materials.

Devices called ion-binding electrodes (IBE's) combine the benefits of conventional batch ion exchange processes with electrochemical regeneration, as disclosed in U.S. Pat. No. 5,019,235 (Nyberg), U.S. Pat. No. 4,888,098 (Nyberg), and U.S. Pat. No. 5,007,989 (Nyberg), all of which are incorporated herein by reference. IBE's typically comprise conductive polymer electrodes, surrounded by and secured to monopolar ion exchange membranes. IBE's operate in batch-mode and provide good ion exchange selectivity, for example the extraction of multivalent ions from solutions containing large concentrations of monovalent ions (e.g., water softening or copper ion extraction processes). Mineral scale fouling of IBE membranes is reduced during the electrochemical regeneration step which involves the production of $H^+$ by water electrolysis. Third, concentrated regenerant effluents may be obtained using IBE devices, facilitating either the recovery of ions in the effluent or its disposal as waste. Furthermore, device design and manufacturing complexity is significantly lower for IBE devices as compared to electrodialysis systems because they operate with a single solution stream, and the ion exchange membranes are supported on electrodes. In contrast, the thin, flexible monopolar membranes used in electrodialysis must be carefully positioned using spacers to obtain efficient ion removal and maintain separation of the two solution streams. IBE cells, however, have two significant drawbacks. They require that the cation and anion exchange membranes are secured to opposite sides of an electrode, thereby increasing cell cost and size, and the electrolysis of water forms hydrogen and oxygen gases which may either damage the interface between the electrode and membranes or interfere with solution flow through the cell.

Electrochemical cells comprising water-splitting ion exchange membranes for production of acids and bases from a variety of salt solutions are disclosed in for example U.S. Pat. No. 2,829,095 (Oda), U.S. Pat. No. 4,024,043 (Dege), and U.S. Pat. No. 4,107,015 (Chlanda), all of which are incorporated herein by reference. These are continuously operated cells which again necessarily comprise two solution streams, in this case two product streams: one an acid solution and the other a base solution. To operate, these cells must comprise monopolar ion exchange membranes to separate the two solution streams. For example, the water-splitting membrane apparatus described in U.S. Pat. No. 2,829,095 (Oda), suitable for the continuous production of HCl and NaOH from the influent NaCl, for example, is comprised of an anion exchange membrane and a cation exchange membrane positioned between each pair of water-splitting membranes of the cell. In the absence of the monopolar membranes, product effluents HCl and NaOH would mix to form water and NaCl, preventing the cell from functioning.

An alternative design and application of an electrochemical cell comprising water-splitting membranes for the continuous removal of ions from a solution stream is described in U.S. Pat. No. 3,654,125 (Leitz), which is incorporated herein by reference. This is a variant of the continuous electrodialysis cell that employs water-splitting membranes rather than monopolar ion exchange membranes to create two separate solution streams: one the product stream from which ions are removed, and the other the waste stream into which ions are concentrated. The anion exchange layers or surfaces of the water-splitting membranes are oriented in the cell to face each other, as are the cation exchange layer surfaces. Only with this orientation can the peculiar NaCl permselectivity characteristics of water-splitting membranes be exploited for the continuous electrodialysis separation process. The Leitz cell and process has the same drawbacks described for the electrodialysis process including poor ion selectivity, susceptibility to fouling by mineral scale or biological growths, and production of considerable water waste volumes. Furthermore, the Leitz cell and process is largely limited to the treatment of NaCl solutions.

Also as a result of their continuous operation, the water-splitting membrane cells of the prior art, both the acid/base production cells and the ion removal cell of Leitz, share the characteristic that the water-splitting membranes comprise a combination of strong-acid sulfonate and strong-base quaternary ammonium ion exchange layers rather than employing other ion exchange materials. This particular combination provides membranes having particularly low electrical resistance and high permselectivity.

Thus, it is desirable to have an ion exchange apparatus and method which provide the benefits of batch ion exchange processes including high ion selectivity, resistance to mineral scale fouling, and concentrated regenerant effluent solutions. Further it is desirable to have an apparatus and method for the regeneration of ion exchange materials which would use electrical power rather than introducing chemicals for regeneration. This would eliminate the inconvenience and environmental hazards associated with regenerant chemicals, and reduce rinse water volumes. Electrical regeneration would also avoid the contamination of regenerant effluent solutions with chemicals. It would also be beneficial to provide an apparatus and method which avoid the need for a multitude of electrodes to avoid generation of excessive volumes of gas and to reduce the cost and size of the device.

SUMMARY

The present invention provides a novel electrochemical apparatus and method for removing or replacing ions in solution streams and ion exchange materials. It combines the advantages of batch ion exchange processes with the efficiency and environmental safety of electrical regeneration. The invention further allows the use of smaller water volumes and less complex equipment designs for ion removal or replacement.

In one aspect, the present invention comprises an electrochemical cell for removing ions from a solution stream comprising a housing having first and second electrodes. At least one water-splitting ion exchange membrane is positioned between the electrodes, the water-splitting membrane comprising (i) a cation exchange surface facing the first electrode, and (ii) an anion exchange surface facing the second electrode. A solution stream pathway is defined by the water-splitting membrane. The solution stream pathway comprises (i) an inlet for the influent solution stream, (ii) at least one channel that allows the influent solution stream to flow past at least one surface of the water-splitting membrane to form one or more treated solution streams, and (iii) a single outlet that combines the treated solution streams to form a single effluent solution. Preferably, the solution stream pathway comprises a unitary and contiguous channel that flows past both the cation and anion exchange surfaces of the water-splitting membrane, and more preferably is connected throughout in an unbroken sequence and extends substantially continuously from the inlet to the outlet.

Another aspect of the present invention comprises an assembly of electrochemical cells for selectively removing multivalent ions from a solution. The assembly comprises a first electrochemical cell including: (1) two electrodes; (2) at least one water-splitting ion exchange membrane between the electrodes, each water-splitting membrane comprising a cation exchange surface facing the first electrode, and an anion exchange surface facing the second electrode; and (3) a first solution stream pathway having (i) an inlet for influent solution stream, (ii) at least one channel that allows influent solution stream to flow past at least one surface of the water-splitting membrane to form one or more treated solution streams, and (iii) a single outlet that combines the treated solution streams to form a first effluent solution. At least one second electrochemical cell in the assembly comprises (1) two electrodes; (2) at least one water-splitting ion exchange membrane between the electrodes, each water-splitting membrane comprising a cation exchange surface facing the first electrode, and an anion exchange surface facing the second electrode; and (3) a second solution stream pathway having (i) an inlet for influent solution stream, (ii) at least one channel that allows influent solution stream to flow past at least one surface of the water-splitting membrane to form one or more treated solution streams, and (iii) a single outlet that combines the treated solution streams to form a second effluent solution. Means are provided for supplying a voltage to the electrodes of the first and second cells. A flow controller apportions a flow of a solution stream into the first and second cells so that the solution stream flows into the first cell at a first flow rate and into the second cell at a second flow rate, the first and second flow rates being selected to provide a desired concentration of multivalent ions in the combined first and second effluent solutions.

The invention also comprises a method of replacing ions in an ion exchange material by applying a voltage to an electrochemical cell. The method comprises: (i) first and second electrodes; (ii) at least one water-splitting membrane between the electrodes, each water-splitting membrane comprising ion exchange layers A and B, one a cation exchange layer facing the first electrode and the other an anion exchange layer facing the second electrode, which layers contain ions $I_{1A}$ and $I_{1B}$, respectively. A unitary and contiguous solution channel is defined by the cation and anion exchange surfaces of the membranes, the solution channel abutting both electrodes and extending continuously from the inlet to the outlet of the housing. An ion-containing solution electrically connects the electrodes and the water-splitting membranes. In the cell, ions $I_{1A}$ and $I_{1B}$ are replaced by ions $I_{2A}$ and $I_{2B}$, respectively.

In yet another aspect, the invention comprises a method for removing multivalent ions from a solution. The method comprises applying a voltage to an assembly comprising first and second electrochemical cells. The first electrochemical cell comprises first and second electrodes and at least one water-splitting membrane between the electrodes. Each water-splitting membrane comprises a cation exchange layer A and an anion exchange layer B, which layers comprise ions $I_{4A}$ and $I_{4B}$, respectively. Ions $I_{4A}$ and $I_{4B}$ comprise substantially $H^+$ and $OH^-$, respectively. The cation exchange layers of the water-splitting membranes face the first electrode, and the anion exchange layers face the second electrode. In the cell there is a unitary and contiguous solution stream. The first electrochemical cell also comprises a solution containing ions $I_{2A}$ and $I_{2B}$ which electrically connects the electrodes and water-splitting membrane, in which cell ions $I_{4A}$ and $I_{4B}$ are replaced by ions $I_{2A}$ and $I_{2B}$. A second electrochemical cell comprises first and second electrodes and at least one water-splitting membrane arranged between the electrodes. Each water-splitting membrane comprises a combination of a cation exchange layer A and an anion exchange layer B. The layers comprise ions $I_{5A}$ and $I_{5B}$, respectively. Ions $I_{5A}$ and $I_{5B}$ comprise monovalent ions other than $H^+$ and $OH^-$, respectively, wherein the cation exchange layers of the water-splitting membranes are oriented to face toward the first electrode and the anion exchange layers of the water-splitting membranes are oriented to face toward the second electrode, in which cell there is a single, contiguous solution stream; and a solution containing ions $I_{2A}$ and $I_{2B}$ which electrically connects the electrodes and water-splitting membrane, in which cell ions $I_{5A}$ and $I_{5B}$ are replaced by ions $I_{2A}$ and $I_{2B}$, respectively.

DRAWINGS

These and other features, aspects, and advantages of the present invention will be better understood from the following drawings, description and appended claims, which illustrate examples of the invention, where:

FIG. 7b is a schematic sectional side view of the spiral wrap cell of FIG. 7a;

DESCRIPTION

The present invention provides an electrochemical cell assembly and methods for removing ions present in solutions, and replacing ions in ion exchange materials.

Figure 1:
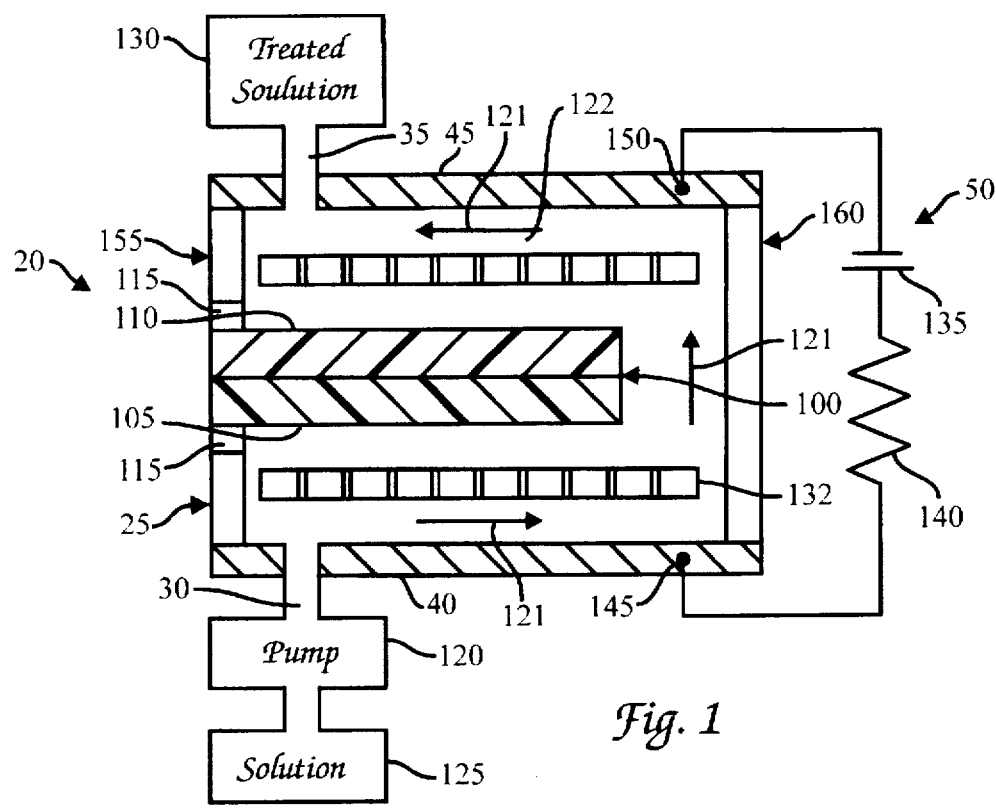
FIG. 1 is a schematic sectional side view of an embodiment of the electrochemical cell of the present invention.

FIG. 1 presents one embodiment of an electrochemical cell assembly 20 of the present invention comprising a housing 25 having at least one inlet 30 for introducing an influent solution stream into the cell, and one outlet 35 that provides a single effluent solution. Opposing first and second electrodes 40, 45 in the cell are powered by electrode voltage supply 50 that supplies a voltage across the electrodes. At least one water-splitting membrane 100 is positioned between the electrodes 40, 45 in the housing 25. Each water-splitting membrane 100 comprises at least one combination of adjacent and abutting cation exchange surface 105 (typically a cation exchange layer having cationic exchange groups) and an anion exchange surface 110 (typically comprising an anion exchange layer having anionic exchange groups). The water-splitting membranes 100 are arranged in the housing 25 so that the cation exchange surfaces of the membranes face the first electrode 40, and the anion exchange surfaces of the membranes face the second electrode 45.

A solution stream pathway (as represented by the arrows 121) is defined by the surfaces of the water-splitting membranes 100, the electrodes 40, 45, and the sidewalls of the cell. The solution stream pathway 121 (i) extends from the inlet 30 (which is used for introducing an influent solution stream into the solution stream pathway), (ii) includes at least one channel that allows the influent solution stream to flow past at least one surface of the water-splitting membrane to form one or more treated solution streams, and (iii) terminates at a single outlet 35 that combines the treated solution streams to form a single effluent solution. The solution stream pathway 121 can comprise a single serial flow channel extending continuously through the cell, or can comprise a plurality of parallel flow channels that are connected and terminate at a single outlet 35. In the embodiment in FIG. 1, the water-splitting membranes 100 are arranged to provide a solution stream pathway 121 having an unitary and contiguous solution channel 122 that flows past both the cation and anion exchange surfaces of the water-splitting membrane. Preferably, the channel 122 is connected throughout in an unbroken sequence extending continuously from the inlet to the outlet, and flowing past the anion and cation exchange surfaces of the water-splitting membranes. Thus the unitary and contiguous channel's perimeter comprises at least a portion of all the cation and anion exchange layer surfaces of the water-splitting membranes in the cell.

The housing 25 typically comprises a plate and frame construction fabricated from metal or plastic and comprises one or more inlet holes 30 to introduce solution into the cell and one or more outlet holes 35 to remove effluent solution from the cell. While one or more outlet holes can be provided, the effluent solution from the cell preferably comprises a single effluent solution stream that is formed before or after the outlet holes (for example in an exhaust manifold that combines the different solution streams). The water-splitting membranes 100 are held in the housing 25 using gaskets 115 positioned on either side of the water-splitting membrane. A pump 120, such as for example, a peristaltic pump or water pressure in combination with a flow control device, is used to flow solution from a solution source 125 through the channel 122 and into a treated solution tank 130. In this embodiment, the pump 120 serves as means to flow a single solution stream through the cell. An electrode voltage supply 50, typically external to the electrochemical cell 20, comprises a direct current voltage source 135 in series with a resistor 140. The electrical contacts 145, 150 are used to electrically connect the voltage supply 50 to the first and second electrodes 40, 45. Instead of a DC current source, the voltage source can also be a rectified alternating current source, for example, a half-wave or full-wave rectified alternating current source.

The anode and cathode electrodes 40, 45 are fabricated from an electrically conductive material, such as a metal which is preferably resistant to corrosion in the low or high pH chemical environments created during positive and negative polarization of the electrodes during operation of the cell 20. Suitable electrodes can be fabricated from copper, aluminum, or steel cores which are coated with a corrosion-resistant material such as platinum, titanium, or niobium. The shape of the electrodes 40, 45 depends upon the design of the electrochemical cell 20 and the conductivity of the solutions flowing through the cell. The electrodes 40, 45 should provide a uniform voltage across the surfaces of the water-splitting membranes 100, a suitable electrode shape for cell 20 being a flat plate dimensioned approximately as large as the area of the water-splitting membrane, positioned at the top and the bottom of the cell 20, and having an electrode surface interior to the housing. Preferably, the first and second electrodes 40, 45 comprise planar structures on either side of planar water-splitting membranes 100 positioned adjacent to one another. Alternative electrode shapes include distributed designs such as woven screens, expanded meshes, or wire shaped in a particular configuration, for example, a serpentine shape. For source solution to enter and exit cell 20, as for example in the embodiment in FIG. 1, it may be necessary to cut openings in the two electrodes 40 and 45 to allow solution to pass into and out of channel 122.

Preferably, the electrodes 40, 45 are constructed of two or more layers that provide the desired combination of electrical conductivity and corrosion resistance. A suitable configuration comprises an inner electrically conductive layer which has a sufficiently low electrical resistance to provide substantially uniform voltage across water-splitting membranes 100; a corrosion resistant layer to prevent corrosion of the electrically conductive layer; and a catalytic coating on the surface of the electrode to reduce operating voltages, extend electrode life, and minimize power requirements. A preferred electrode structure comprises a copper conductor covered by corrosion-resistant material such a titanium or niobium, and thereafter coated with a noble metal catalyst layer such as platinum.

The gaskets 115 separating the water-splitting membranes 100 in cell 20 and forming its sidewalls 155, 160 have multiple functions. In the first function, the gaskets 115 prevent leakage of the solution through the sidewalls 155, 160 of the cell 20. In another function, the gaskets 115 are made of an electrically insulating material to prevent shorting or divergence of the electrical current channel through the sidewalls 155, 160 of the cell 20. This forces the electrical current channel, or the electrical field between the electrodes 40, 45, to be directed substantially perpendicularly through the plane of the water-splitting membranes 100 to provide more efficient ion removal or replacement. Within solution channel 122 are preferably positioned spacers 132, for example, layers of plastic netting material suspended form the sidewalls of the cell. Spacers 132 serve several functions: they separate water-splitting membranes 100, provide more uniform flow, and create turbulence in the solution stream pathway to provide higher ion transport rates. If two or more water-splitting membranes are in direct contact, excess current may flow through this low resistance path, overheating the membranes and bypassing the solution (thereby reducing cell performance). This spacer may be of any construction having an average pore size or opening greater than 10 µm in diameter. Solution channel 122 in the cell may also comprise ion exchange material particles or filaments, for example beads, granules, fibers, loosely woven structures, or any other structure which allows the solution in the channel 122 to contact both the cation and anion exchange layer surfaces of the water-splitting membranes that form a portion of the periphery of the channel. Any ion exchange material located in channel 122 still provides a single, contiguous solution stream in cell 20. The ion exchange material in channel 122 may comprise cation exchange material, anion exchange material, or a mixture of the two. However, the ion exchange material located in channel 122 should not be in the form of a monopolar ion exchange membrane that separates two or more solution streams in the cell. Thus, the cell preferably comprises substantially no monopolar ion exchange membranes between adjacent water-splitting membranes.

The water-splitting membrane 100 is any structure comprising a cation exchange surface 105 and an anion exchange surface 110 in combination such that under a sufficiently high electric field, produced by application of voltage to electrodes 40 and 45, water is dissociated into its component ions $H^+$ and $OH^-$ in the membrane. This dissociation occurs most efficiently at the boundary between the cation and anion exchange surfaces or layers in the membrane, or in the volume between them, and the resultant $H^+$ and $OH^-$ ions migrate through an ion exchange layer in the direction of the electrode having an opposite polarity. For example, $H^+$ will migrate toward the negative electrode (cathode), and $OH^-$ will migrate toward the positive electrode (anode). Preferably, the water-splitting membrane comprises abutting cation and anion exchange layers 105, 110 that are secured or bonded to each other to provide a water-splitting membrane 100 having a unitary laminate structure. The cation and anion exchange layers 105, 110 can be in physical contact without a bond securing them together, or the water-splitting membrane 100 can include a non-ionic middle layer, for example a water-swollen polymer layer, a porous layer, or a solution-containing layer.

Figure 2:
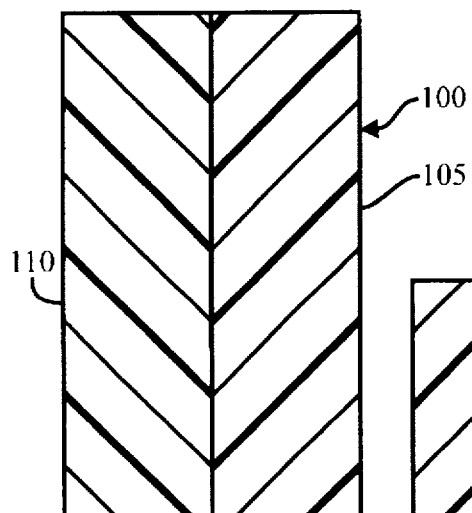
FIG. 2 is a schematic sectional diagram of a water-splitting ion exchange membrane showing the anion and cation exchange surfaces.

An expanded sectional diagram of an embodiment of a water-splitting membrane 100 comprising abutting cation and anion exchange surfaces or layers is shown in FIG. 2. Suitable cation exchange layers 105 can comprise one or more acidic functional groups capable of exchanging cations such as $—COOM$, $—SO_3M$, $—PO_3M_2$, and $—C_6H_4OM$, where M is a cation (e.g., hydrogen, sodium, calcium, or copper ion). Cation exchange materials also include those comprising neutral groups or ligands that bind cations through coordinate rather than electrostatic or ionic bonds (for example pyridine, phosphine and sulfide groups), and groups comprising complexing or chelating groups (e.g., those derived from aminophosphoric acid, aminocarboxylic acid, and hydroxamic acid). The choice of cation exchange functional group depends upon the application of the cell 20. In water deionization for which the non-selective removal of ions is required, $—SO_3M$ groups are preferred for their ability to impart good membrane swelling, high mass transport rates, and low electrical resistances over a wide range of pH. For the selective removal of copper ion from a liquid containing other ions, for example sodium ion, ion exchange groups such as —COOM or a chelating group such as aminocarboxylic acid are preferred. These weak acid groups offer the additional benefit of particularly efficient regeneration due to the strongly favorable reaction of —(COO)$_n$M with H$^+$ to form —COOH and expel M$^{+n}$, where M is a metal ion.

Suitable anion exchange layers 110 of water-splitting membrane 100 comprise one or more basic functional groups capable of exchanging anions such as —NR$_3$A, —NR$_2$HA, —PR$_3$A, —SR$_2$A, or C$_5$H$_5$NHA (pyridine), where R is an alkyl, aryl, or other organic group and A is an anion (e.g., hydroxide, bicarbonate, chloride, or sulfate ion). The choice of anion exchange functional group also depends on the application. In water deionization, —NR$_3$A is preferred for its ability to impart good membrane swelling, and thus provide low electrical resistances and high mass transport rates, over a wide range of pH. Weak base groups are preferred when particularly efficient regeneration is required. For example, —NR$_2$HA will react with OH$^-$ in a very favorable reaction to form —NR$_2$, H$_2$O, and expel A$^-$.

Figure 3:
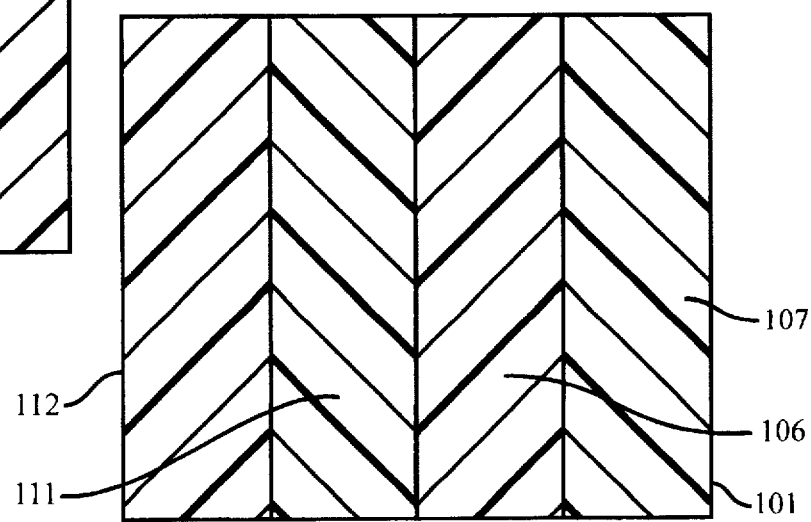
FIG. 3 is a schematic sectional diagram of another embodiment of a water-splitting ion exchange membrane comprising multiple cation and anion exchange layers.

The water-splitting ion exchange membranes can also comprise more than two anion and cation exchange layers. Water-splitting membrane 101 in FIG. 3 is an embodiment comprising four ion exchange layers: two cation exchange layers 106 and 107 and two anion exchange layers 111 and 112. The two cation or two anion exchange layers may differ in ion exchange capacities or ion exchange functional groups. For example, the inner cation exchange layer 106 of water-splitting membrane 101 may comprise substantially —SO$_3$ groups and the outer layer 107 comprise —COOH groups; while the inner anion exchange layer 111 may comprise —NR$_3$ groups and the outer layer 112 comprise —NR$_2$H groups. Alternatively, cation exchange layers 106 or 107 or anion exchange layers 111 or 112 can be porous to hold solution. The porous layers may be open cell foams, for example prepared using foaming agents or leaching techniques, woven and non-woven fiber composites comprising ion exchange granules, or any other structure which provides fast solution transport through at least a portion of the water-splitting ion exchange membrane thickness, thereby increasing the rate of solution contact with ion exchange material contained within the porous layer and increasing the rate of solution flow through the cell. Preferably, the porous layers have an average pore diameter of at least 1 µm, more preferably greater than 10 µm; and pore volumes of at least 10% of the porous layer volume, and more preferably at least 20%.

The water-splitting ion exchange membranes may be prepared by any method, for example those which provide homogeneous or heterogeneous ion exchange membranes. Homogeneous membranes are formed by polymerizing appropriate monomers followed by one or more chemical steps to introduce the ion exchange groups. Typically a monomer which cross-links the resultant polymer is included to provide an insoluble ion exchange material. Polymerization may take place in the presence or absence of a solvent, and depending on the choice of solvent, one obtains ion exchange materials which can be further characterized as gel (prepared without solvent), isoporous (good monomer and polymer solvent), or macroporous (good monomer but poor polymer solvent). A typical method for preparing homogeneous membranes is to cast monomer mixtures between glass sheets, taking care to prevent monomer or solvent evaporation, and heating to cure. Subsequent chemical functionalization is as for other ion exchange materials (e.g., beads). Water-splitting membranes may be prepared by several related methods including casting a second monomer mixture on a cured layer followed by stepwise chemical functionalization of the two layers, or by the chemical functionalization of a single cast layer from the two sides using different functionalization chemistry.

Heterogeneous water-splitting ion exchange membranes comprise a host polymer intimately mixed with particles of homogeneous ion exchange material. The ion exchange particles absorb substantially more water than the host polymer, with the latter providing the membrane with structural integrity. Since the ion exchange particles are typically larger than one micron in cross-section, these water-splitting membranes have a heterogeneous structure on the micron scale. A preferred method of preparing heterogeneous membranes is by melt blending ion exchange material, for example in a granulated form, and thermoplastic polymers, for example polyethylene, polyethylene copolymers, or polyvinylidene fluoride. Any process suitable for melt blending the host polymer may be employed, for example using a roll mill or mixing extruder. Individual, thin sheets of ion exchange material may be formed by, for example, compression molding or extrusion, and water-splitting membranes may be formed from two or more layers by the same methods.

The ion exchange material for use in heterogeneous water-splitting membranes is preferred to have an average particle size less than 200 microns, more preferably, less than 100 microns. Small particles may be obtained by direct synthesis of small beads, for example in emulsion polymerization, or by granulating larger ion exchange beads having the desired chemical and physical properties. For the preparation of the heterogeneous membranes used for the examples described herein, granulated ion exchange resins were obtained from Graver Chemical Company: PCH strong acid cation exchange resin (H$^+$-form) and PAO strong base anion exchange resin (OH$^-$-form). The volume fraction of ion exchange material in the cation and anion exchange layers of heterogeneous water-splitting membranes is preferred to be at least 30%, more preferably at least 35%, most preferably at least 40%.

The choice of host polymer for use in heterogeneous membranes depends upon the requirements for the resultant water-splitting membranes and the maximum processing temperatures allowable for the ion exchange material. For example if stiff, incompressible membranes are required for a plate and frame construction cell, as shown in FIG. 1, one may select a host polymer such as high density polyethylene (HDPE). In contrast, a spiral construction cell may require flexible water-splitting membranes, and an elastomer such as ethylene-propylene thermoplastic may be preferred. Alternatively, the host polymer may be a water-swellable material, for example poly(ethylene oxide) or polyvinylalcohol. This may provide faster ion transport through the ion exchange layers of the water-splitting membranes. To avoid dissolution of water swellable polymer, it may be advantageous to cross-link the host polymer/ion exchange material composite to provide an insoluble, cross-linked structure. Cross-linking may be accomplished after forming the composite into the final shape (e.g., sheets) either using chemical agents or radiation (for example UV, electron or gamma radiation). Cross-linking may also provide mechanical benefits to non-water swellable host polymer composites, for example improved tear resistance.

The cation and anion exchange layers of the water-splitting membranes preferably comprise ion exchange capacities of at least about 0.1 meq/cc, more preferably at least 0.2 meq/cc, and most preferably at least 0.5 meq/cc. Higher ion exchange capacities result in increased membrane swelling in solution and lower electrical resistance. Higher ion exchange capacity also provides an apparatus which requires less frequent regeneration for a given volume of water-splitting membrane material. Another approach to reducing the frequency of the regeneration step is to use water-splitting membranes having greater thickness to increase ion exchange capacity. Preferably, the water-splitting membranes have a solution saturated thickness of at least about 200 microns (μm), more preferably at least 400 μm, most preferably at least 600 μm.

Figure 4:
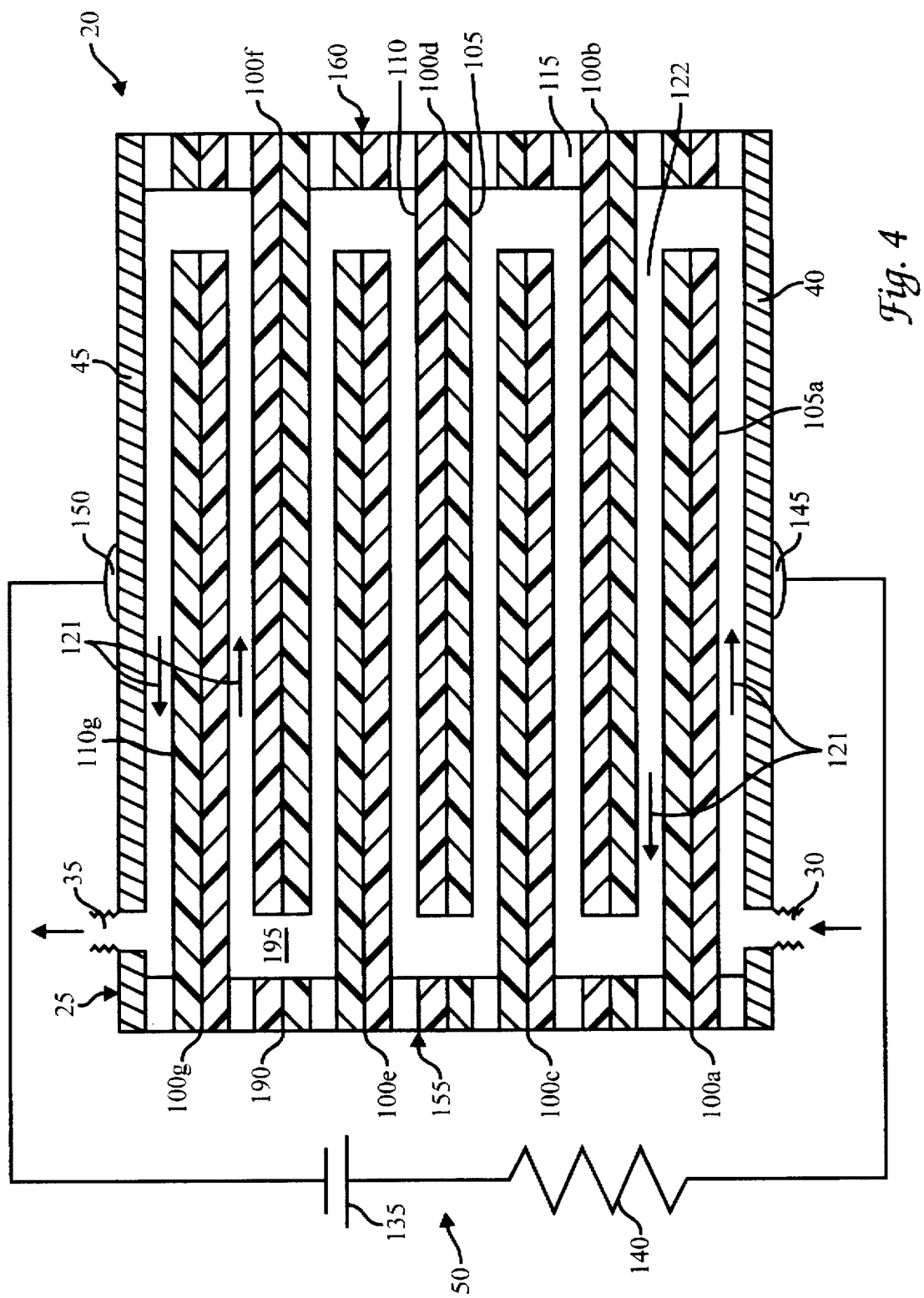
FIG. 4 is a schematic sectional side view of another embodiment of the electrochemical cell of the present invention having a plurality of water-splitting membranes.

Another version of the electrochemical cell 20 of the present invention is shown in FIG. 4. In this version, electrochemical cell 20 comprises a plurality of water-splitting membranes 100a–g. Each water-splitting membrane comprises a cation exchange surface 105 and an anion exchange surface 110. Water-splitting membranes 100a–g are separated by gaskets 115 and stacked one on another to form an interdigited arrangement having one or more openings 195 located near one end of each water-splitting membrane 100a–g. The membranes 100a–g are attached to the sidewalls of the cell 20 at alternating ends to provide an interdigited stacked arrangement. This arrangement defines a solution stream pathway 121 in a channel 122 that allows solution entering inlet 30 to flow past substantially the entire surfaces of the water-splitting membranes 100a–g to eventually exit at outlet 35. The water-splitting membranes 100a–g are arranged in the housing 25 such that the solution stream passes through a unitary and continuous solution channel 122. The first water-splitting membrane 100a comprises a cation exchange surface 105a directly facing the first electrode 40, and the last water-splitting membrane 100g comprises an anion exchange surface 110g directly facing the second electrode 45. Segments of the water-splitting membrane 190 can also be positioned adjacent to the openings 195 to increase the surface area of the water-splitting membrane exposed to the solution stream in the channel 122. The first and second electrodes 40, 45 are positioned in the housing 25 to provide a current flow having a direction that is substantially transverse to the planes of the water-splitting membrane surfaces 100a–g. This cell design allows higher ion removal or replacement rates than the cell of FIG. 1 due to the larger total surface area of water-splitting membrane in contact with the solution stream, while at the same time allowing the treatment of greater volumes of solution due to the larger ion exchange capacity. The total surface area of the water-splitting membrane is selected to provide the desired change in ion concentration during removal or replacement operations at the required flow rate.

Figure 5:
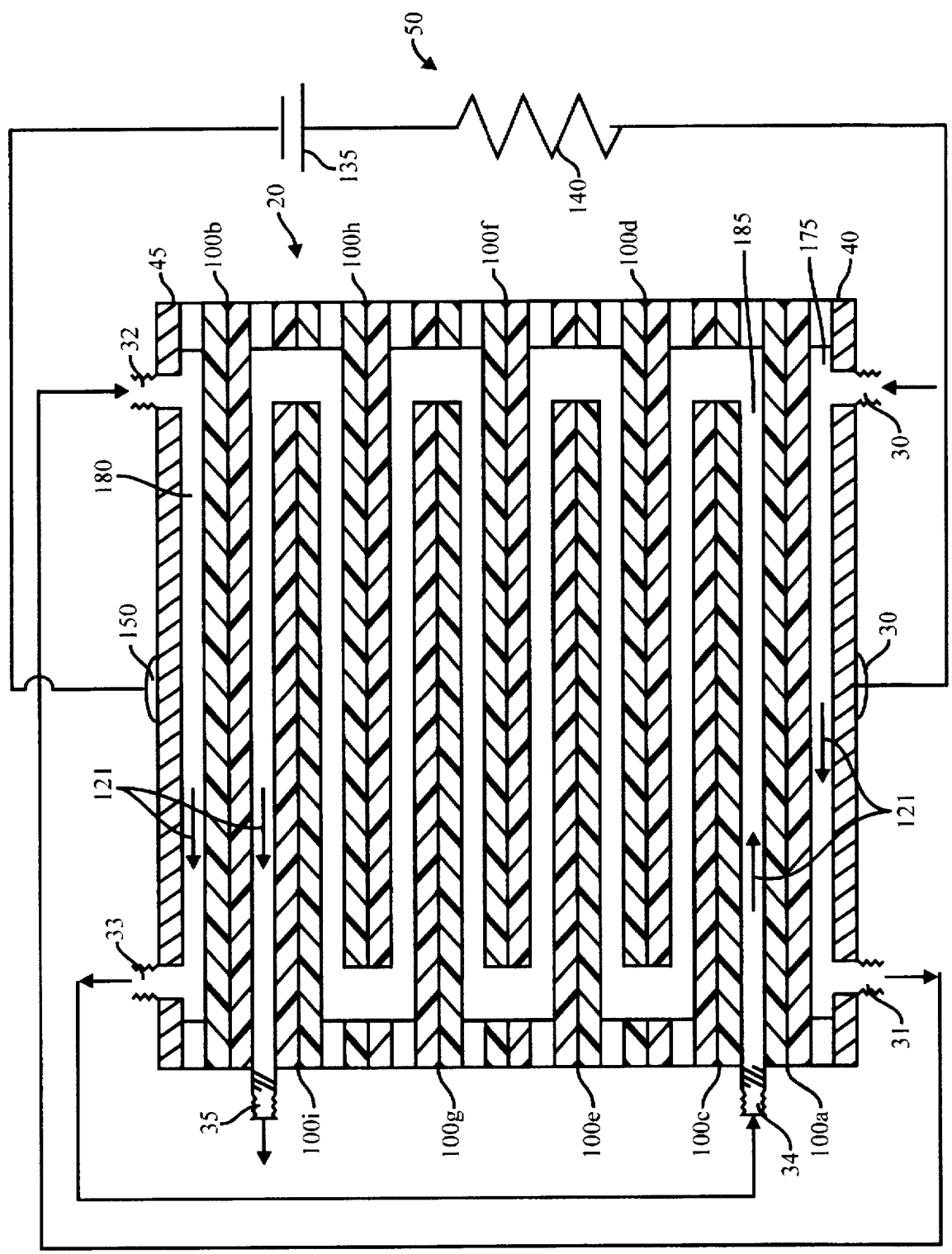
FIG. 5 is another embodiment of the cell of FIG. 4.

Yet another embodiment of electrochemical cell 20 is shown in FIG. 5. In this example, the solution stream pathway 121 initially passes through inlet 30, into a first solution channel section 175 between the first electrode 40 and water-splitting membrane 100a, then through outlet 31. Thereafter, via inlet 32 the solution stream pathway 121 enters a second solution channel section 180 which lies between second electrode 45 and water-splitting membrane 100b, and exits at outlet 33. The solution stream pathway 121 is then directed through inlet 34 into the third channel section 185 which is between pairs of water-splitting membranes 100a–i. Finally, treated solution exits at outlet 35. The combination of the channel sections 175, 180, then 185 forms a continuous channel similar to that of the cells of FIGS. 1 and 4. This embodiment of the invention provides a product solution which does not contact one of the electrodes as it exits the cell, thereby providing a solution free of the hydrogen ion or hydroxide ion produced by water electrolysis at both electrodes. This occurs because the unitary and contiguous channel 22 initially flows the solution stream past both electrodes (i.e., through the channel segments 175 and 180) and thereafter, flows the solution stream past the remaining surfaces of the water-splitting membranes in the central portion of the cell (i.e., through the channel segment 185). This embodiment is thus particularly useful for operating as a water deionizer because the effluent exiting at outlet 35 is not contaminated by electrode water electrolysis products (ions). These product ions not only increase effluent water conductivity, but also provide acidic or basic effluents (rather than neutral pH solutions).

Figure 6:
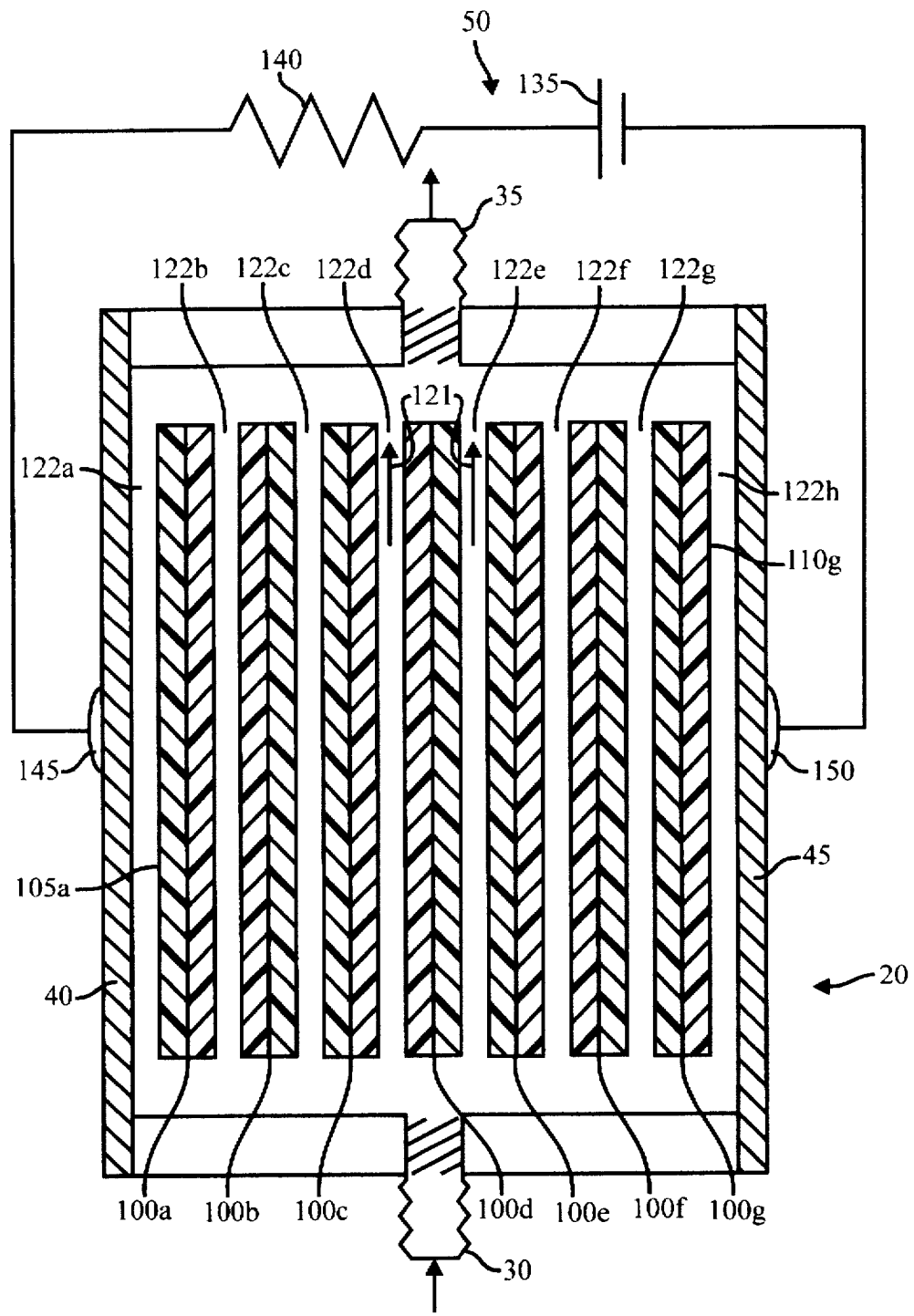
FIG. 6 is a schematic sectional side view of an embodiment of an electrochemical cell having parallel solution flow through a multitude of solution channels that provide a single effluent solution.

Another embodiment of an electrochemical cell 20 comprising a plurality of planar water-splitting membranes 100a–g is presented in FIG. 6. In this cell, water-splitting membranes 100a–g are positioned between electrodes 40 and 45 in housing 25 to provide a solution stream pathway 121 comprising a plurality of channels 122a–h separated by the membranes. Solution entering inlet 30 is split or manifolded to pass through these parallel solution channels 122a–h. This arrangement of water-splitting membranes allows the solution stream in each channel 122b–g to be simultaneously exposed to the anion and cation exchange surfaces of alternating water-splitting membranes. The solution stream flowing through the channels 122a and 122h is exposed to one of the electrodes 40, 45 and the anion exchange surface 105a or the cation exchange surface 110g on either side of the cell. While this cell design does not provide a single unitary and continuous solution channel in the cell, the effluent solutions from each of the channels are combined to provide a single effluent solution. Because the solution stream in the cell flows past substantially both anion and cation exchange surfaces in each channel segment (except for the first and last segments which have a minimal effect on the total ion removal efficiency of the cell) to form a contiguous solution stream, the solution passing through channels 122a–h are combined into a single effluent solution, for example at outlet 35, without adversely affecting the outcome of the water treatment step (for example deionization). That is the solution in each channel is undergoing the same operation (e.g., deionization or regeneration). Because the solution stream within each channel 122b–g is simultaneously exposed to a cation and an anion exchange layer surface of water-splitting membranes 100a–g and the solution streams in the two outer channels 122a and 122h are exposed to at least one surface of a water-splitting membrane, channels 122a–h are substantially equivalent. In contrast, prior art electrodialysis processes do not mix the two solution streams to form a single effluent solution after they exit the cell because this would cause mixing of the product and waste streams to provide a solution having substantially the composition of the incoming solution source. The result would be to provide no net removal or regeneration of ions. In contrast, the present systems mix the solution streams to provide the single effluent solution volume which is characteristic of batch ion exchange processes. This allows one to obtain the benefits of batch ion exchange:ion selectivity, resistance to fouling, and concentrated regenerant solutions.

Figure 7A:
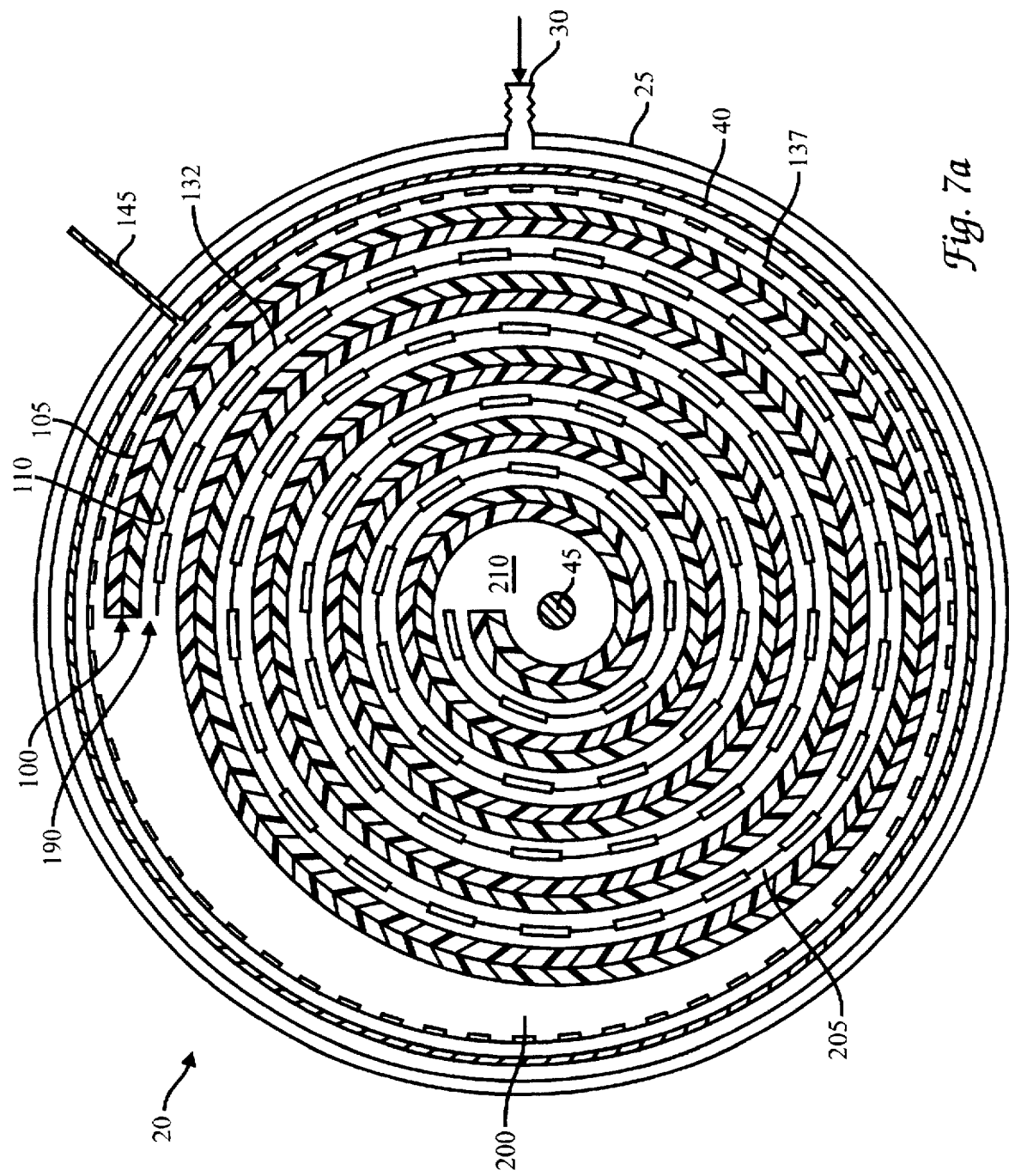
FIG. 7a is a schematic sectional top view of another embodiment of the electrochemical cell of the present invention showing a spiral-wrap cell having a unitary and continuous solution channel.
Figure 7B:
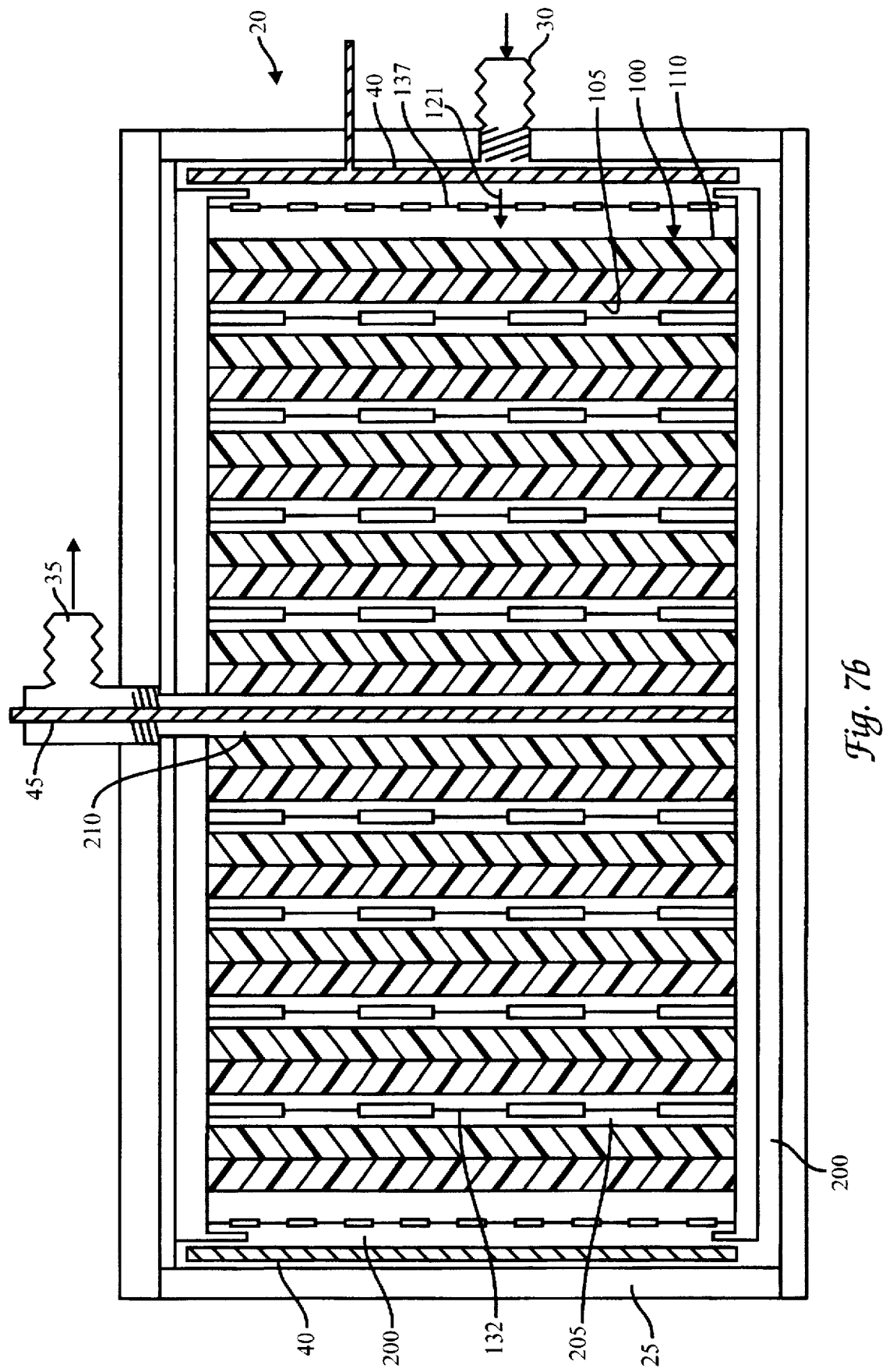

An embodiment of the present invention in the form of spiral-wrap electrochemical cell 20 is shown in FIGS. 7a and 7b (top and side views of the cell). In this version, at least one water-splitting membrane 100 is wrapped or rolled with an adjacent spacer 132 to provide a circular shape as viewed from the top (FIG. 7a). The spiral wrapped assembly preferably comprises at least two complete wraps of water-splitting membrane (the cell illustrated in FIG. 7a has five complete wraps). To hold the spiral wrapped assembly in a well-defined diameter and to separate and space it from the outer electrode 40, the spiral wrap assembly is preferably placed in a cylindrical plastic mesh tube 137. Outer electrode 40 is cylindrical in shape and has a diameter greater than the diameter of the rolled water-splitting membrane and spacer (including mesh tube if employed). An inner electrode 45 is provided in the central space of the spiral wrap, preferably in the center. Inner electrode 45 may be any shape as long as it is not in physical contact with the inner surface of the water-splitting membrane. It may be shaped for example as a solid cylinder or rod, a solid tube, a mesh tube, or have a noncylindrical shape (e.g., a square cross-section). The outer electrode may be the first or second electrode of electrochemical cell 20. Since the cation exchange surfaces 105 of water-splitting membranes 100 face toward the first electrode 40, the outer electrode is the first electrode 40 in this example. Alternatively, the outer electrode may be the second electrode 45, in which case anion exchange layers 110 of water-splitting membranes 100 would face the outer electrode. As viewed from the side in FIG. 7b, an inlet 30 is provided on the outer wall of housing 25 and an outlet 35 is located on the top of the cell. Solution flows through inlet 30 into channel section 200, through opening 190 of the spiral-wrap assembly and into channel section 205 which lies between wraps of water-splitting membrane 100. In channel section 205 the solution stream simultaneously contacts both the cation and anion exchange layers 105 and 110 of water-splitting membranes 100. Solution then enters channel section 210 and exits at outlet 35. Alternatively, the solution may flow in the opposite direction. This arrangement of water-splitting membranes again provides an unitary contiguous solution stream through the cell 20.

Figure 8:
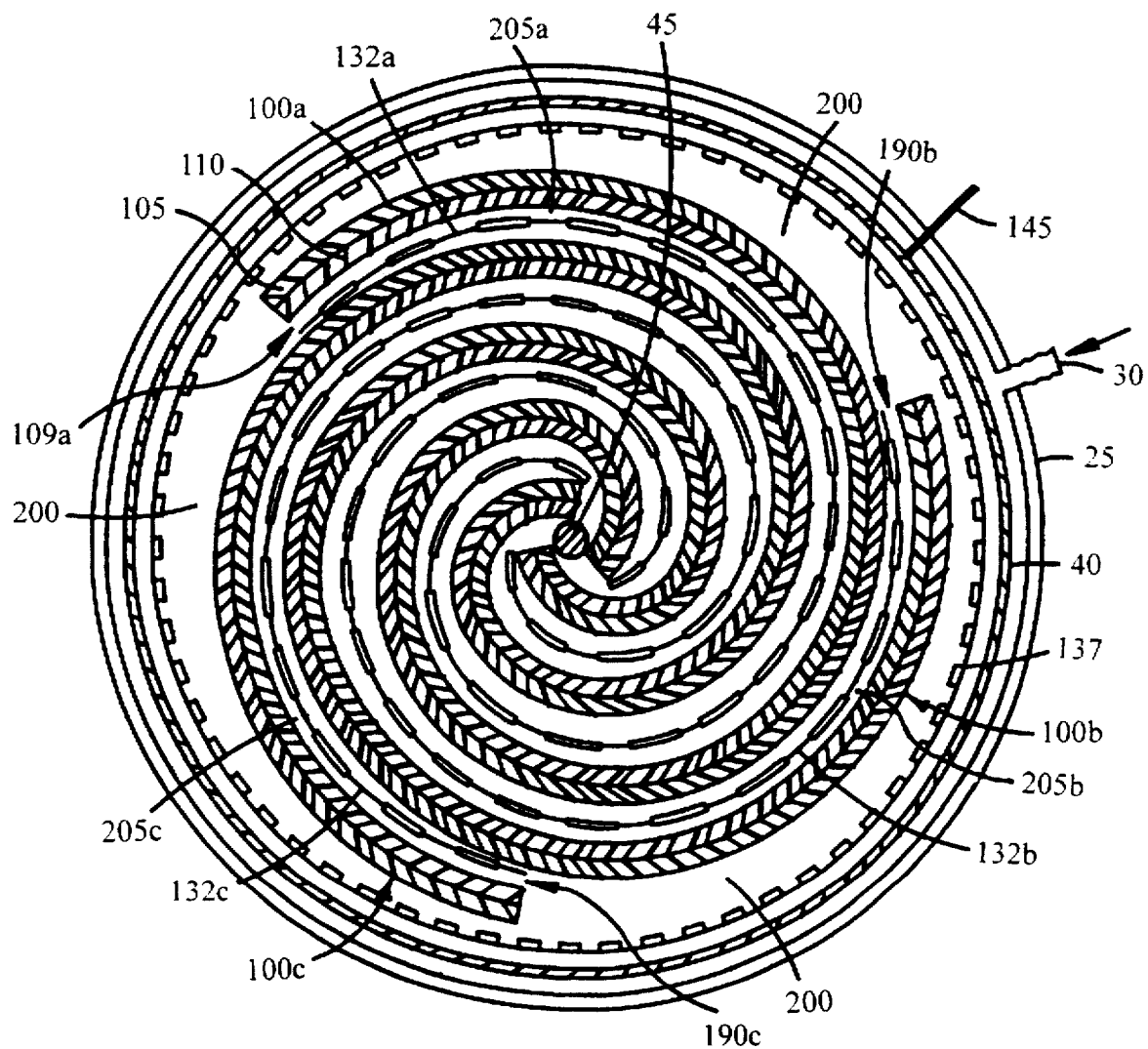
FIG. 8 is a schematic sectional top view of another embodiment of the spiral wrap cell showing three water-splitting membranes wrapped in a parallel arrangement to provide three parallel channels that provide a single effluent solution.

Another example of the spiral wrap electrochemical cell 20 of the present invention is illustrated in FIG. 8. This spiral-wrap cell 20 comprises three water-splitting membranes 100a–c separated from each other by three spacers 132a–c, which are stacked one on another and rolled into the spiral arrangement. This spiraled assembly may again be located inside a cylindrical, plastic mesh tube 137 to both contain the assembly in a well-defined diameter and to separate it from the outer electrode 40. Housing 25, electrodes 40 and 45, and inlet 30 and outlet 35 are located as for the spiral-wrap cell comprising a single water-splitting membrane. Before rolling or spiraling, the three water-splitting membranes 100 and three spacers 132 are stacked in an alternating arrangement with the cation exchange layers oriented to face in one direction (either face-up or face-down). In this flat arrangement, the ends of each water-splitting membrane/spacer pair are off-set such that upon rolling, the three openings 190a–c of spiral-wrap assembly are evenly distributed around the spiral periphery (approximately 120° apart as shown in FIG. 8). Solution enters housing 25 via inlet 30, enters channel 200, and passes through gaps 190a–c of the spiral-wrap assembly where it is split into three parallel solution streams which pass through channels 205a–c. Each solution stream simultaneously contacts both the cation and anion exchange surfaces 105 and 110 of water-splitting membranes 100 as it spirals inward, all three streams combining into a single channel 210 at the center of the spiral-wrap to provide a single effluent solution emerging from the cell at outlet 35.

In all of the embodiments of the electrochemical cell of the present invention illustrated herein as examples, the water-splitting membranes are arranged in the cell to provide a single effluent solution exiting the cell, with all the solution streams passing through the cell at a given time experiencing the same treatment operation (e.g., deionization or regeneration). The single solution stream is introduced in one inlet and exits at one outlet. Water exiting the electrochemical cell of the present invention is combined, or may be combined, without reducing the effectiveness of the apparatus or process. This is in sharp contrast to prior art electrodialysis equipment and processes which are constructed using monopolar ion exchange membranes or water-splitting membranes and have separate waste and product solution streams. The electrodialysis systems which operate continuously depend upon maintaining two separate solution streams, namely, a product stream from which ions are removed and a waste stream into which ions are deposited. The separation of these two solution streams is most commonly provided by monopolar ion exchange membranes. Mixing of the two solution streams as they exit an electrodialysis cell would provide a solution identical to the incoming source solution, thereby providing no net ion removal or replacement. In contrast, the cells of the present invention produce a single solution stream exiting the cell as a result of their batch-mode of operation. This in turn provides apparatus providing high ion selectivity, resistance to fouling, and concentrated regenerant solutions, advantages not realized by processes which operate continuously and which therefore employ at least two effluent solution streams.

The electrochemical cell of the present invention is further characterized by having no unitary, separately standing, monopolar ion exchange membranes positioned between adjacent water-splitting membranes. The batch mode operation of the present invention eliminates the need for monopolar ion exchange membranes to separate solution streams. Also, in the present cells, the water-splitting membranes are arranged with the cation exchange layers oriented to face toward the first electrode and the anion exchange layers facing toward the second electrode. This is required so that all water-splitting membranes are operating in either the production mode (e.g., deionization) or the regeneration mode. Arranging some water-splitting membranes with the cation or anion exchange layers facing each other would reduce the efficiency of both the production step and subsequent regeneration step. Because all cation and anion exchange layers of water-splitting membranes face the first and second electrodes, respectively, the electric field provided by the application of voltage to the two electrodes has a direction which is substantially transverse or normal to the surfaces of the water-splitting membranes. This provides the advantage of assisting the mass transport of ions (via migration) produced by the water-splitting reaction directly perpendicular toward the surface of the membranes (to provide the shortest pathway through the membrane to increase the efficiency of ion exchange removal), or alternatively, drawing ions in from solution or into the ion exchange layers of the water-splitting membranes normal to the surface. This in turn provides full utilization of ion exchange material since it prevents divergent electric fields or current fluxes which may bypass large portions of ion exchange material. A uniform electric field or current flux directly transverse to the membranes provides the most uniform current distribution and ion flow pattern through the water-splitting membranes.

In certain exemplary cell designs of the present invention, the water-splitting membranes are additionally arranged to provide a unitary and contiguous solution channel. This arrangement provides serial solution flow; it also provides a channel whose perimeter comprises at least a portion of all cation and anion exchange layer surfaces of the water-splitting membranes in the cell. Alternatively, as in other examples presented herein, the water-splitting membranes may be arranged to provide a multitude of solution channels, an arrangement which provides parallel solution flow through the cell, the outlet solution streams being combined at a single outlet of the cell to provide a single effluent solution. Electrodialysis cells cannot be constructed in such an arrangement as this does not provide the separate waste and product solution streams required for electrodialysis processes.

When the electrochemical cell of the present invention comprises a plurality of water-splitting membranes, adjacent water-splitting membranes are arranged to provide at least one solution channel in the cell in which the solution stream is simultaneously exposed to both a cation and an anion exchange surface of water-splitting membranes. Because the electrodialysis cells of the prior art are continuous processes, solution in all channels of these cells is exposed to at least one monopolar ion exchange membrane, or in the Leitz cell, to two cation or two anion exchange layers (not both) of water-splitting membranes.

The method of operation for the electrochemical cell of the present invention will be illustrated for the treatment of a sodium chloride solution and for treatment of a copper sulfate solution. Although the invention is illustrated with respect to these two selected examples, it should be understood that the present invention can be used for many other applications, and should not be limited to the examples provided herein. In the first example, sodium chloride is removed and concentrated from a solution. The electrochemical cell comprises water-splitting membranes having sulfonate cation exchange layers and quaternary ammonium anion exchange layers. In the first stage of the process, ion removal, the first electrode facing the cation exchange layer is positively charged (the anode), and the second electrode is negatively charged (the cathode). At the interface between the cation and anion exchange layers of the water-splitting ion exchange membranes, water in the solution stream is split into its component ions $H^+$ and $OH^-$, and $OH^-$ migrates through the cation exchange surfaces toward the first (positive) electrode while $H^+$ migrates through the anion exchange surfaces toward the second (negative) electrode. In this stage, $Na^+$ diffuses and migrates through the cation exchange surfaces in the direction of the negative electrode. The reactions occurring in the cation exchange layers are:

$$P\text{---}SO_3H+Na^+=P\text{---}SO_3Na+H^+ \quad (1)$$

$$H^++OH^-=H_2O \quad (2)$$

where "P" refers to the polymer or solid support to which the ion exchange group is attached. The $OH^-$ produced by the water-splitting reaction and migrating through the cation exchange surfaces reacts with $H^+$ to form water. The consumption of $H^+$ maintains the electric and concentration gradients which promote the rate of removal of $Na^+$ from solution.

Within the anion exchange layer, $Cl^-$ diffuses and migrates through the anion exchange layer in the direction of the positive electrode. The reactions occurring in the anion exchange layers are:

$$P\text{---}NR_3OH+Cl^-=P\text{---}NR_3Cl+OH^- \quad (3)$$

$$H^++OH^-=H_2O \quad (4)$$

Analogous to the situation in the cation exchange layer, the $H^+$ produced by the water-splitting reaction reacts with $OH^-$ to promote the rate of removal of $Cl^-$ from solution.

While the ion removal stage can be performed without voltage (or current), ion removal rates are substantially slower due to the absence of the migration and chemical neutralization effects described above. Without voltage the irreversible water-splitting reaction does not occur, and thus neutralization reactions (2) and (4) cannot take place. Ion removal rates are then governed exclusively by the diffusion rates of $Na^+$, $H^+$, $Cl^-$, and $OH^-$ through the cation and anion exchange layers.

After the ion exchange groups within the water-splitting membrane's cation and anion exchange layers are fully occupied by $Na^+$ and $Cl^-$ ions, respectively, a regeneration process is required to return the water-splitting ion exchange membranes to their original chemical form prior to reactions (1) to (4). In this stage, a solution stream is introduced into the cell, as for example, the same sodium chloride solution treated in the first stage, and the polarity of the electrodes is reversed so that the first electrode is now the negative electrode and the second electrode is the positive electrode. In this stage, $H^+$ produced by the water-splitting reaction moves through the cation exchange layer in the direction of the negative electrode causing reaction (5):

$$P\text{---}SO_3Na+H^+=P\text{---}SO_3H+Na^+ \quad (5)$$

Similarly, $OH^-$ produced in the water-splitting reaction moves through the anion exchange layer in the direction of the positive electrode, causing reaction (6) to occur:

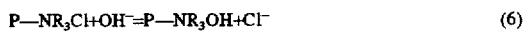

$$P\text{---}NR_3Cl+OH^-=P\text{---}NR_3OH+Cl^- \quad (6)$$

The $Na^+$ and $Cl^-$ replaced by $H^+$ and $OH^-$ in the cation and anion exchange layers combine to form NaCl in the effluent solution stream. By controlling the solution flow rate during this regeneration stage, a concentration of NaCl substantially higher than was present in the incoming solution stream during the ion removal stage can be produced. If ion removal in reactions (1) to (4) was intended to deionize a solution stream, then the NaCl concentrate formed during reactions (5) and (6) is discarded. If the purpose of NaCl removal in this apparatus was to isolate this salt, then the NaCl concentrate is saved for further processing.

The operation of this exemplary cell will be described in the context of the removal and subsequent concentration of $CuSO_4$ from a solution. Any suitable ion exchange materials can be used in the cation and anion exchange layers of the water-splitting membranes. For example, the cation exchange layers may comprise P—COOH groups, and the anion exchange layers may comprise $P\text{---}NR_2H$ groups. During ion removal, $OH^-$ produced in the water-splitting reaction again moves through the cation exchange layers toward the positive electrode, and reactions (7) and (8) occur within the cation exchange layers:

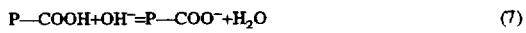

$$P\text{---}COOH+OH^-=P\text{---}COO^-+H_2O \quad (7)$$

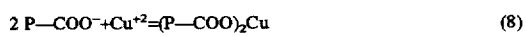

$$2\,P\text{---}COO^-+Cu^{+2}=(P\text{---}COO)_2Cu \quad (8)$$

$Cu^{+2}$ cannot replace $H^+$ in P—COOH directly due to unfavorable thermodynamics, and thus reaction (7) is required to remove $H^+$ from P—COOH, forming P—COO⁻ which readily reacts with $Cu^{+2}$.

In the anion exchange layers, $H^+$ produced in the water-splitting reaction moves through the anion exchange layers toward the negative electrode, causing reactions (9) and (10) to occur:

$$P\text{---}NR_2+H^+=P\text{---}NR_2H^+ \quad (9)$$

$$2\,P\text{---}NR_2H^++SO_4^{-2}=(PNR_2H)_2SO_4 \quad (10)$$

Reaction (9) forms an ionic group from the neutral P—NR$_2$, enabling the subsequent reaction with SO$_4^{-2}$ in reaction (10).

When ion removal is complete, the cation and anion exchange layers are returned to their condition prior to ion removal by flowing the same or a different solution through the cell and reversing the polarity of the electrodes. H$^+$ produced in the water-splitting reaction now moves through the cation exchange layers, resulting in reaction (11):

$$(P\text{—}COO)_2Cu + 2\ H^+ = 2\ P\text{—}COOH + Cu^{+2} \qquad (11)$$

and OH$^-$ produced in the water-splitting reaction moves through the anion exchange layers, resulting in reaction (12):

$$(P\text{—}NR_2H)_2SO_4 + 2\ OH^- = 2\ P\text{—}NR_2 + 2\ H_2O + SO_4^{-2} \qquad (12)$$

Both reactions (11) and (12) are thermodynamically favorable, allowing the concentration of CuSO$_4$ in the solution stream. In a subsequent step, the copper and/or sulfate may be recovered from the solution stream or discarded.

The method of replacing ions in an ion exchange material illustrated in the two preceding examples may be described in general terms as follows. The water-splitting membranes comprise ion exchange layers A and B, one a cation exchange layer and the other an anion exchange layer, which layers contain ions I$_{1A}$ and I$_{1B}$, respectively. An ion-containing solution electrically connects the electrodes and the water-splitting membranes, and upon application of a sufficient voltage to the two electrodes, water at the interfacial region between ion exchange layers A and B is "split" into its component ions H$^+$ and OH$^-$. This phenomenon, referred to as the "water-splitting reaction," involves the spontaneous dissociation of water into component ions H$^+$ and OH$^-$ (dissociation occurs with or without the electric field), followed by the migration of these ions into ion exchange layers A and B under the influence of the electric field. H$^+$ migrates toward the negative electrode, and OH$^-$ toward the positive electrode. As the H$^+$ and OH$^-$ migrate into layers A and B, more water diffuses to the interfacial region to continue the water-splitting reaction cycle. As H$^+$ and OH$^-$ move through ion exchange layers A and B, they cause the replacement of ions I$_{1A}$ and I$_{1B}$ by ions I$_{2A}$ and I$_{2B}$ from the solution, respectively. This replacement of ions in ion exchange layers A and B may be either a direct replacement, for example H$^+$ for Na$^+$ on a P—SO$_3^-$ ion exchange group, or it may be an indirect replacement, for example as occurs when OH$^-$ reacts in a first step with P—COOH to form P—COO$^-$, followed by reaction to bind Cu$^{+2}$.

These electrochemical cells and methods for the removal or replacement of ions in the single solution stream passed through the cell are unique in their ability to combine the advantages of batch ion exchange and electrochemical regeneration. These cells thus provide the good ion selectivity, resistance to mineral scale fouling, and concentrated regenerant effluent solutions typical of conventional ion exchange. By using electricity for regeneration, they provide substantially reduced environmental hazards by avoiding chemicals and reducing rinse water volumes. Electrical regeneration also eliminates the contamination of regenerant effluent solutions with chemicals, facilitating the recovery of product or disposal of waste. This combination of benefits is also accomplished without the need for the multitude of electrodes required for IBE devices.

Figure 9:
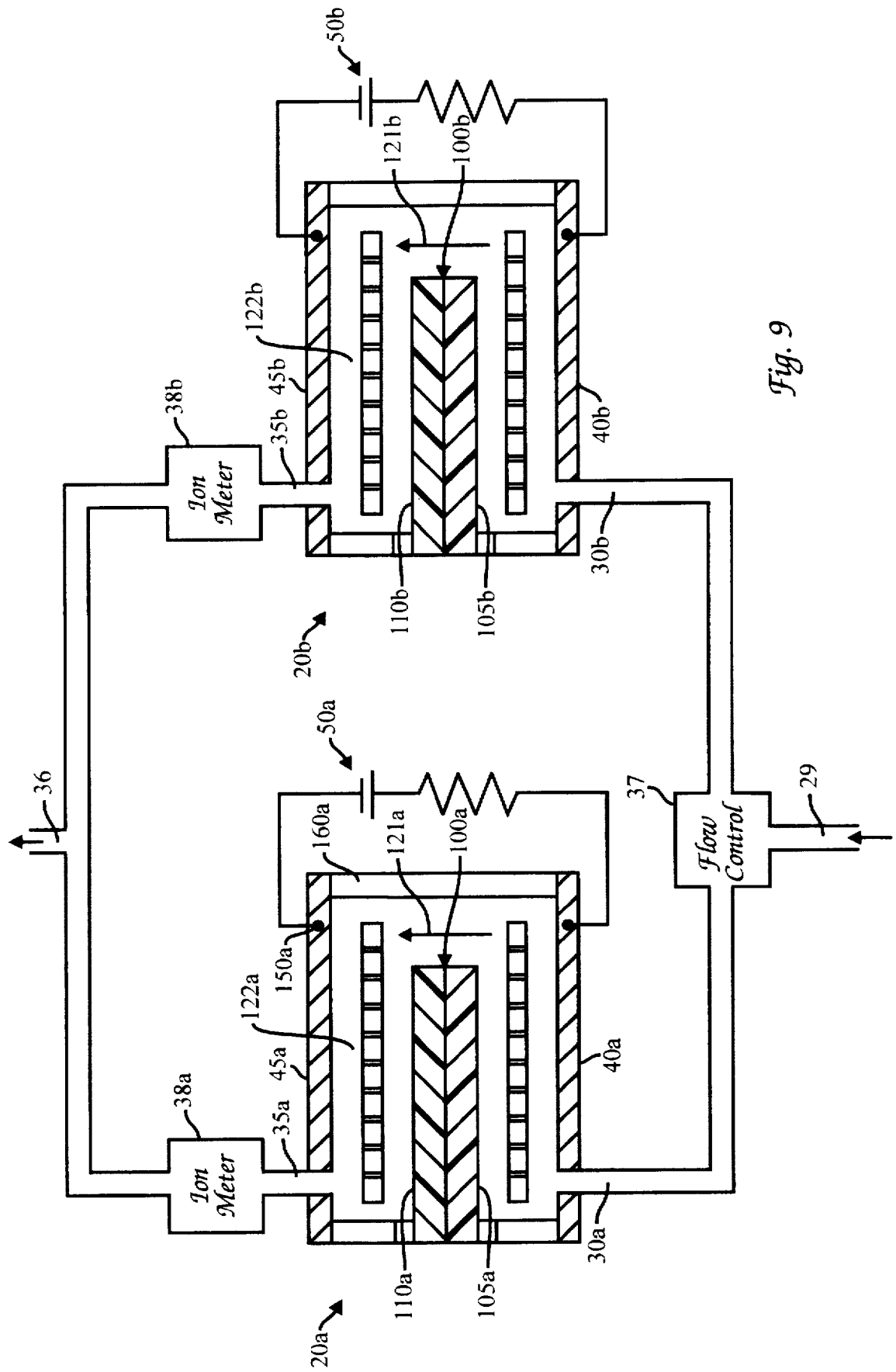
FIG. 9 is a schematic partial sectional diagram of an ion exchange apparatus for removal of multivalent ions from a solution stream comprising two electrochemical cells.

With reference to FIG. 9, an assembly of electrochemical cells for selectively removing multivalent ions from a solution will now be described. The assembly comprises a first electrochemical cell 20a including first and second electrodes 40a and 45a, with at least one water-splitting membrane 100a located between the first and second electrodes. The cation exchange surface 105a faces the first electrode 40a, and the anion exchange surface 110a faces the second electrode 45a, the electrodes being powered by a voltage supply 50a. The assembly further comprises a second electrochemical cell 20b including first and second electrodes 40b and 45b, with at least one water-splitting membrane 100b located between the first and second electrodes. The cation exchange surface 105b faces the first electrode 40b, and the anion exchange surface 110b faces the second electrode 45b. The assembly further comprises a flow controller 37 for apportioning the flow of a solution stream into the first and second cells so that the solution stream flows into first cell 20a at a first flow rate and into second cell 20b at a second flow rate. Solution enters first cell 20a via inlet 30a and exits as the first effluent at outlet 35a. Similarly, solution flows into second cell 20b through inlet 30b and exits as the second effluent at outlet 35b. The first and second flow rates are selected to provide a desired concentration of ions exiting at cell assembly outlet 36 which combines the first and second effluent solutions from the two cells. The assembly can further comprise ion meters 38a and 38b for (i) measuring the concentration of ions in the first and second effluents, (ii) generating an output signal proportional to the measured ion concentrations, and (iii) feeding the signal to flow controller 37. Flow controller 37 then apportions the solution stream to first and second cells 20a and 20b in response to the output signal from sensors 38a and 38b to control the ion concentration in the combined effluent solution passing through the single outlet 36 of the two cells.

In this version, the ion removal efficiency of first cell 20a is maintained greater than that of second cell 20b, that is the average concentration of dissolved monovalent ions in the second effluent is greater than that of the first effluent over the course of a water treatment cycle. The first cell 20a is substantially fully regenerated at the beginning of an operating cycle: the cation and anion exchange layers of the water-splitting membranes of the first cell comprise substantially H$^+$ and OH$^-$, respectively. Preferably, the first cell 20a is a regenerated cell. Thus the first cell 20a functions as a water deionizer, removing both monovalent and multivalent ions from the solution stream. In contrast, the ion exchange capacity of the second cell 20b is depleted; it comprises monovalent and multivalent ions other than H$^+$ and OH$^-$. Preferably the second cell 20b was used as a first cell 20a in a previous operating cycle, and thus its ion exchange capacity has been at least partially consumed. By ion exchange capacity is meant the ability of the cell to absorb more monovalent ions from solution. Preferably the ion exchange capacity of the second cell for monovalent ions is substantially exhausted due to its prior use. Thus as solution passes through the second cell 20b, multivalent ions in solution replace the monovalent ions in the water-splitting membranes. The second cell 20b thus functions as a water softener. After regeneration with a salt solution, the ion exchange resin beads of a conventional water softener comprise monovalent ions (most often sodium). These are replaced by multivalent ions absorbed from the solution stream due to the approximately ten-fold greater affinity of the preferred ion exchange material (having sulfonate groups) for multivalent ions.

Figure 10:
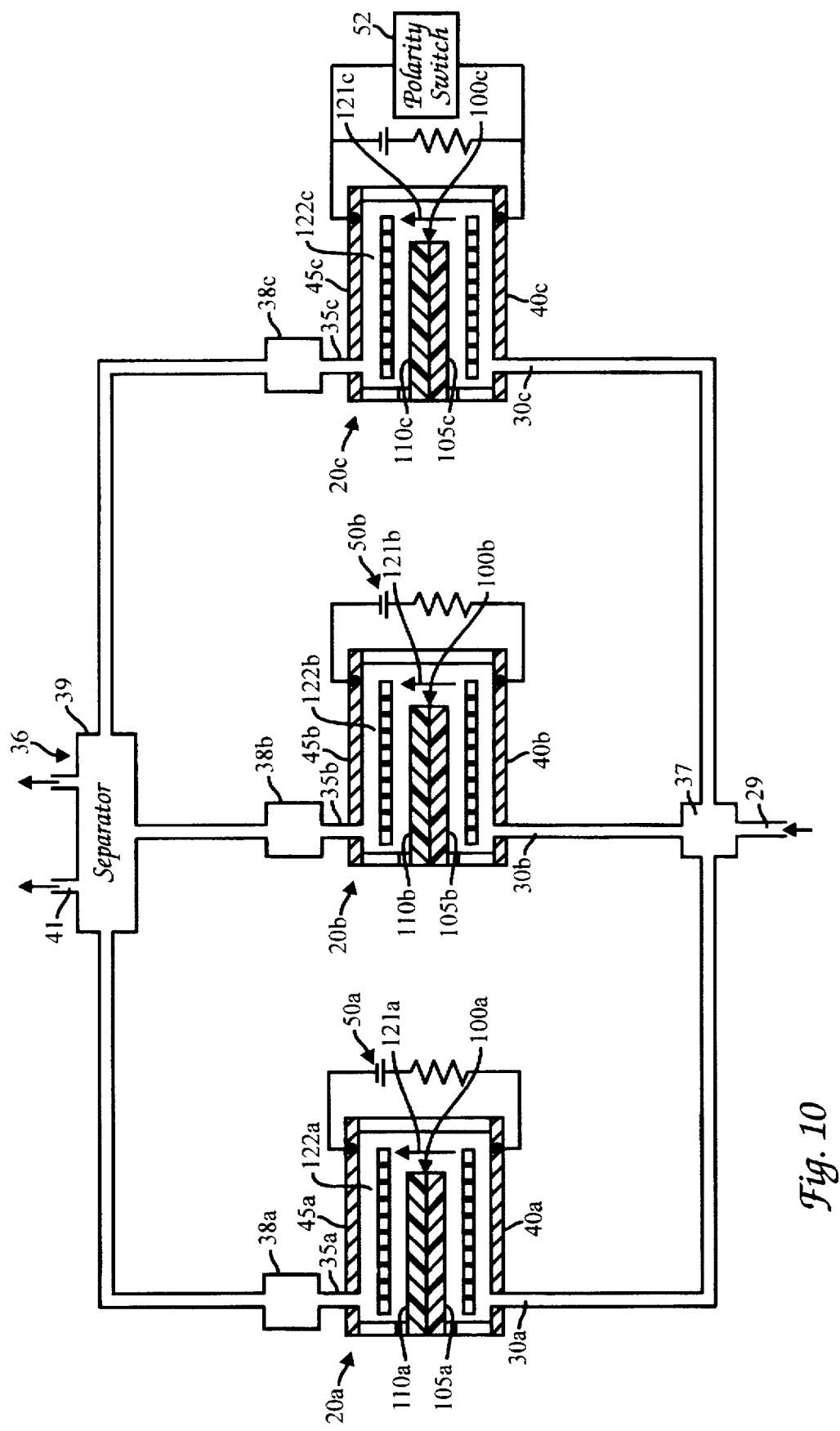
FIG. 10 is a schematic partial sectional diagram of an ion exchange apparatus for removal of multivalent ions from a solution stream comprising a third electrochemical cell.

As shown in FIG. 10, the assembly may also comprise a third cell 20c comprising first and second electrodes 40c and 45c, at least one water-splitting membrane 100 between the electrodes and a voltage supply 50 powering the electrodes. Also included are means 37 for flowing a solution stream through inlet 30c while a separate solution stream is flowing through cells 20a and 20b. Polarity switching means 52 is provided for reversing the polarity of the first and second electrodes of the third cell, 40c and 45c. The third cell 20c operating in a reversed polarity function serves to regenerate itself during operation of the first and second cells 20a, 20b. Also provided is a separator means 39 for segregating the waste water stream 41 and product water stream 36 exiting cell 20c. The multi-cell assemblies in FIGS. 9 and 10 may further comprise switching capabilities as part of means 37 and 39 for changing solution flow into and out of cells 20a, 20b and 20c. Flow and voltage polarity switching operations may occur in response to a signal from sensor/feedback means 38a, 38b, and 38c, for example to automatically initiate the regeneration of a second cell 20b after its capacity for removing multivalent ions has been exhausted, or to ready a regenerated cell 20c for use as a first cell 20a.

Operation of the assembly of first and second cells 20a, 20b, and optionally the third cell 20c, will be illustrated in the context of a method for removing multivalent ions from a solution using an assembly comprising at least two electrochemical cells, as shown in FIG. 9. This method will be described for the treatment of a solution containing a mixture of calcium sulfate and sodium chloride. For both cells in this example, the cation and anion exchange layers of the water-splitting membranes comprise sulfonate and quaternary ammonium groups, respectively; and the cation exchange layers face toward the positive electrode (the first electrode is positive). The water-splitting membranes may alternatively comprise other ion exchange groups, for example weak acid, weak base, or chelating ion exchange groups. The solution stream is apportioned between the first and second cells of the assembly at first and second flow rates respectively. In the first cell 20a, reactions (13) through (15) occur within the cation exchange material:

$$P\text{---}SO_3H+Na^+ = P\text{---}SO_3Na+H^+ \tag{13}$$

$$2\,P\text{---}SO_3H+Ca^{+2} = (P\text{---}SO_3)_2Ca+2\,H^+ \tag{14}$$

$$2\,P\text{---}SO_3Na+Ca^{+2} = (P\text{---}SO_3)_2Ca+2\,Na^+ \tag{15}$$

Sodium ion released in reaction (15) may be consumed by reaction (13).

Reactions (16) through (18) take place within the anion exchange material:

$$P\text{---}NR_3OH+Cl^- = P\text{---}NR_3Cl+OH^- \tag{16}$$

$$2\,P\text{---}NR_3OH+SO_4^{-2} = (P\text{---}NR_3)_2SO_4+2\,OH^- \tag{17}$$

$$2\,P\text{---}NR_3Cl+SO_4^{-2} = (P\text{---}NR_3)_2SO_4+2\,Cl^- \tag{18}$$

Chloride released in reaction (18) may be consumed in reaction (16). The substitution of hydrogen and hydroxide ions in the water-splitting membranes by sodium, calcium, chloride and sulfate ions in solution in reactions (13) through (18) results in the substantial reduction of the equivalent ion concentration of the first effluent. The equivalent ion concentration is the moles/liter of electrical charge in solution. For example, one mole/liter of calcium sulfate and two moles/liter of sodium chloride each possess two moles of charge/liter (they are equivalent ion concentrations). The reduction in calcium ion concentration for solution passing through the first cell is preferably at least 60%, more preferably at least 70%, most preferably at least 80%. Reactions (15) and (18) occur as a result of the greater affinity of sulfonate and quaternary ammonium ion exchange groups for divalent calcium and sulfate ions over monovalent sodium and chloride ions. Consequently, the calcium and sulfate ions concentrate near the inlet of the first cell 20a, and the sodium and chloride ions occupy ion exchange sites downstream nearer the outlet of the first cell. The water treatment cycle is completed when the equivalent ion concentration of the first effluent reaches a predetermined level. The first cell 20a is then ready for use as a second cell 20b in a subsequent cycle.

While the first solution is treated in reactions (13) through (18) at a first flow rate, the remaining portion of the incoming solution is passing in parallel through the second cell at a second flow rate. Since the second cell 20b served as a first cell 20a in the previous cycle, its water-splitting membranes comprise calcium and sulfate ions nearer the inlet, and sodium and chloride ions nearer the outlet. Thus reactions (19) and (20) predominate in the second cell:

$$2\,P\text{---}SO_3Na+Ca^{+2} = (P\text{---}SO_3)_2Ca+2\,Na^+ \tag{19}$$

$$2\,P\text{---}NR_3Cl+SO_4^{-2} = (P\text{---}NR_3)_2SO_4+2\,Cl^- \tag{20}$$

The reduction in calcium ion concentration in the second cell is preferably at least 50%, more preferably at least 60%, most preferably at least 70%. The replacement of sodium in the ion exchange material by calcium in reaction (19) is the conventional water softening reaction. The method of the present invention further removes divalent anions from solution (reaction 20), which does not occur in conventional water softening. The solution stream exiting the assembly is a mixture of the first and second effluents, and is thus (1) substantially free of divalent calcium and sulfate ions, and (2) has a reduced equivalent ion concentration. In contrast, conventional water softening consists of the substitution of two sodium ions for each calcium ion; there is no reduction in divalent anion or equivalent ion concentrations.

Deionization reactions (13), (14), (16) and (17) may also occur in the second cell 20b at the start of the cycle since some of the ion exchange groups still comprise $H^+$ and $OH^-$ (prior to use as the second cell, the first cell's ion exchange capacity may not have been fully exhausted). This remaining $H^+$ and $OH^-$ reduces the equivalent ion concentration in the second effluent, but to a lesser extent than in the first cell 20a. As the cycle proceeds, and the $H^+$ and $OH^-$ are replaced, the equivalent ion concentration of the second effluent increases and approaches that of the incoming solution stream. To provide a constant, predetermined equivalent ion concentration in the assembly effluent throughout the solution treatment cycle, one may include a feedback system comprising sensors to monitor the ion concentrations in the first and second effluents and flow controllers to vary the first and second flow rates (deionization efficiency is a function of flow rate), as shown in FIG. 9.

At the completion of the water treatment cycle, the exhausted second cell 20b is regenerated to prepare it for use as a first cell 20a in a subsequent cycle. This off-line operation requires reversing the electrode polarity of the second cell 20b so that the cation exchange layers are facing toward the negative electrode, and introducing a separate solution stream. Reactions (21) and (22) occur in the cation exchange layers:

$$(P\text{---}SO_3)_2Ca+2\,H^+ = 2\,P\text{---}SO_3H+Ca^{+2} \tag{21}$$

$$P\text{---}SO_3Na+H^+ = P\text{---}SO_3H+Na^+ \tag{22}$$

In the anion exchange layers, reactions (23) and (24) take place:

During regeneration, sodium and calcium in the cation exchange layer are substantially replaced by hydrogen ion, and chloride and sulfate in the anion exchange layer are substantially replaced by hydroxide ion. The regeneration effluent contains only the calcium, sodium, sulfate and chloride ions which were removed in the previous cycle. It does not comprise the additional ions introduced during chemical regeneration.

In general terms, the method for removing multivalent ions from a solution stream comprises passing a current through first and second electrochemical cells $20a$, $20b$. The first electrochemical cell $20a$ comprises first and second electrodes $40a$, $45a$ and at least one water-splitting ion exchange membrane $100a$ between the electrodes to provide a unitary and contiguous solution stream through the cell. The water-splitting membranes $100a$ comprise ion exchange layers A and B, one a cation exchange layer and the other an anion exchange layer, which layers comprise ions $I_{4A}$ and $I_{4B}$, respectively. Ions $I_{4A}$ and $I_{4B}$ are substantially $H^+$ and $OH^-$. An ion-containing solution flows through the first cell $20a$ at a first flow rate and electrically connects the electrodes and water-splitting membranes. The second electrochemical cell $20b$ comprises first and second electrodes $40b$, $45b$ and at least one water-splitting ion exchange membrane $100b$ arranged between the electrodes to provide a unitary and contiguous solution stream. The water-splitting membranes comprise ion exchange layers A and B, one a cation exchange layer and the other an anion exchange layer, which layers comprise ions $I_{5A}$ and $I_{5B}$, respectively, ions $I_{5A}$ and $I_{5B}$ comprising monovalent ions other than $H^+$ and $OH^-$ (for example sodium ion). An ion-containing solution flows through the second cell $20b$ at a second flow rate and electrically connects the electrodes and water-splitting membranes.

Upon the application of sufficient voltage to the two electrodes of the first and second cells $20a$, $20b$, ions $I_{4A}$ and $I_{4B}$ in the first cell $20a$ are replaced by ions $I_{2A}$ and $I_{2B}$, respectively, from the incoming solution. At the same time, ions $I_{5A}$ and $I_{5B}$ in the second cell $20b$ are replaced by ions $I_{2A}$ and $I_{2B}$, respectively. The first effluent from the first cell $20a$ is substantially deionized as this cell removes both monovalent and multivalent ions from the source solution. In the second cell $20b$, multivalent ions are removed efficiently, but monovalent ions much less so since this cell comprises substantially monovalent ions at the start of the cycle. The first and second effluents are combined at the outlet of the assembly of cells to provide a solution stream having substantially lower multivalent and equivalent ion concentrations than the incoming solution stream. The method of removing multivalent ions from a solution stream may further comprise the step of controlling the flow rates of the solution through the first and second cells $20a$, $20b$ to obtain a predetermined concentration of ions in the first and second effluent streams. It may also include the step of monitoring the composition of the first and second effluent streams, and adjusting the flow rates of the solution through the first and second cells in relation to the composition of the first and second effluent streams.

When the capacity of the second cell $20b$ for multivalent ions is reduced to an unacceptable level, it is regenerated to prepare it for use as a first cell $20a$ by reversing the polarity of the electrodes in the second cell $20b$ and introducing a separate solution stream. This causes ions $I_{2A}$ and $I_{2B}$ to be replaced by ions $I_{4A}$ and $I_{4B}$ respectively (ions $I_{4A}$ and $I_{4B}$ being substantially $H^+$ and $OH^-$). When regeneration is complete, the former first cell becomes a second cell, and the regenerated second cell becomes a first cell. A third electrochemical cell $20c$ may be employed in the method to allow regeneration of a spent second cell $20b$ without the need to interrupt the water treatment step. The third electrochemical cell $20c$ comprises first and second electrodes $40c$, $45c$ and at least one water-splitting ion exchange membrane $100c$ between the electrodes arranged to provide a single, contiguous solution stream. The water-splitting membranes $100c$ comprise ion exchange layers A and B, one a cation exchange layer and the other an anion exchange layer, which layers comprise ions $I_{2A}$ and $I_{2B}$, respectively. A solution which is separate from that flowing into the first and second cells $20a$, $20b$ electrically connects the electrodes and water-splitting membranes of the third cell $20c$. The polarity of the third cell $20c$ is reversed relative to that for the first and second cells, such that in the third cell ions $I_{2A}$ and $I_{2B}$ are replaced by ions $I_{4A}$ and $I_{4B}$, respectively. At the completion of this regeneration step, the third cell $20c$ is ready for use as a first cell $20a$. When the capacity of the second cell for multivalent ions is reduced to an unacceptable level, the newly regenerated third cell is substituted for a first cell, the exhausted first cell becomes a second cell, and the second cell becomes a third cell.

This assembly of electrochemical cells and method for removing multivalent ions from solution is novel for its ability to reduce a solution's equivalent ion concentration while providing water substantially free of multivalent ions (for example softened water). It further provides the important benefit of electrical regeneration rather than requiring frequent regeneration using sodium or potassium chloride salts. For use in residential water softening, for example, the ability of the assembly and method of the present invention to reduce equivalent ion concentration while removing multivalent ions provides water having less monovalent salt than is provided by conventional water softeners. This lower total salt concentration provides not only a better tasting water, but may offer health benefits for individuals needing to control their consumption of sodium chloride. Furthermore, the use of electrical regeneration eliminates the need for customers to purchase and carry home 50 lb bags of salt from their local grocery store to refill their conventional water softeners every several weeks. Electrical regeneration provides the further advantage of preventing the disposal of salt-rich regenerant solution into the sewer which can interfere with the normal operation of downstream municipal waste treatment plants. With electrical regeneration, the only ions flushed into the sewer are those which were removed in the previous water treatment cycle.

EXAMPLE 1

A plate and frame cell was constructed as described in FIG. 1 from seven water swollen, 14 cm by 7 cm water-splitting ion exchange membranes each about 2 mm thick when swollen, two contiguous sheet DSA electrodes (proprietary catalyst on titanium substrate; Electrode Corporation), and eight 2 mm thick Buna N (cured rubber) gaskets. The housing consisted of 17 cm by 10 cm rigid plastic plates, 2.5 cm thick, uniformly compressed using twelve metal bolts passing through the edges of the plates. Electrical connections were made between the electrodes and washers mounted on the outside of the plastic plates using metal springs.

The water-splitting membranes were of the heterogeneous type and prepared with two ion exchange membrane layers. The anion exchange material was prepared from 66% vacuum dried PAO (by weight) converted to the chloride form (PAO is granulated quaternary ammonium anion exchange resin in the hydroxide form; Graver Corporation) and 34% Marlex 6003 (high density polyethylene; Phillips Corporation). The cation exchange material was prepared from 60% vacuum dried PCH converted to the sodium form (PCH is granulated sulfonated cation exchange resin in the acid form; Graver Corporation) and 40% Marlex 6003. The ion exchange resins were blended into the polyethylene using a Brabender mixer equipped with sigma blades (50 cc capacity) at 185° C. over seven minutes, and membranes were compression molded into 15 cm by 15 cm. 0.75 mm thick slabs at 190° C. Water-splitting ion exchange membranes were then prepared by laminating a cation exchange layer to an anion exchange layer to form a sheet 1.5 mm thick in the dry form. This swelled in water to about 2 mm thickness. The water-splitting membranes for use in the cell were cut to the 14 cm by 7 cm dimensions from water swollen membranes.

A power supply which limited the current to 60 or 120 mA and limited the voltage to 127 V was employed. To expel ions which had been absorbed from solution in a prior experiment, the cell was regenerated by powering at 60 or 120 mA (ca. 40 V) for 60 to 120 minutes with the first electrode having negative polarity; this electrode faces the cation exchange layers. An aqueous solution having a conductivity of 1000 µS/cm was passed through the cell at a rate of 5 ml/minute. This solution contained 1.83 mM $CaCl_2$, 0.82 mM $MgSO_4$, 2.40 mM $NaHCO_3$. The ionic conductivity of the effluent solution stream of deionized water collected during regeneration was recorded.

The polarity of the electrodes was then reversed to deionize 1.89 liters of the same solution. The voltage was held at 127 V throughout deionization during which time the current varied from 23 to 53 mA. The ionic conductivity of the treated solution was recorded. The influence of regeneration current and time on deionization efficiency as measured by % ion removal is presented in Table 1. It is evident that during regeneration, the conductivity of the solution collected after regeneration is higher than that of the incoming solution, demonstrating that during regeneration ions are expelled from the water-splitting membranes and concentrated in solution. It can also be seen that high deionization efficiencies may be obtained using this device (up to 98% removal of ions). Further, the volume of water consumed during regeneration is small: only 300 to 600 ml (16% to 32% the volume of product water).

TABLE 1

Influence of Regeneration Current and Time on Deionization Performance

| Expt No. | Regeneration Current (mA) | Regeneration Time (minutes) | Regeneration Effluent Conductivity (µS/cm) | Deionization Efficiency, (% Ions Removed) |
| --- | --- | --- | --- | --- |
| 1 | 60 | 60 | 1420 | 67% |
| 2 | 60 | 60 | 1620 | 72% |
| 3 | 120 | 60 | 1820 | 89% |
| 4 | 120 | 60 | 2160 | 92% |
| 5 | 60 | 120 | 1240 | 94% |
| 6 | 60 | 120 | 1260 | 92% |
| 7 | 120 | 120 | 1430 | 98% |
| 8 | 120 | 120 | 1400 | 98% |

EXAMPLE 2

Using the cell of Example 1, the influence of deionization voltage was examined. Regeneration was carried out for 120 minutes at 120 mA, followed by deionization of 1.89 liters. For both regeneration and deionization, water conductivity was 1000 µS/cm and flow rates were 5 ml/minute. The results of varying voltage during deionization from 0 V (no power) to 127 V are presented in Table 2. While power is not required to remove ions from water, deionization efficiency is substantially improved by employing even small voltages (e.g., 40 V).

TABLE 2

Influence of Deionization Voltage on % Ions Removed

| Expt No. | Deionization Voltage | Deionization Efficiency (% Ions Removed) |
| --- | --- | --- |
| 1 | 0 | 27% |
| 2 | 0 | 31% |
| 3 | 40 V | 72% |
| 4 | 40 V | 71% |
| 5 | 80 V | 90% |
| 6 | 80 V | 94% |
| 7 | 127 V | 98% |
| 8 | 127 V | 98% |

EXAMPLE 3

The apparatus and method of removing multivalent ions from a solution stream was demonstrated using two cells operating in parallel. Each cell (the first and second cells) consisted of three spiral-wrapped cartridges constructed as described in FIG. 8 and connected in series vis-a-vis solution flow. The water-splitting membranes for all cartridges were 7 cm wide, 77 cm long, and 1 mm thick, and were of the same composition as in the previous examples except for the use of flexible, ethylene-copolymer binder rather than rigid, high density polyethylene. Spacer material was 1 mm thick polypropylene netting (XN1678; Conwed Plastics), 7 cm wide and 85 cm long. Each spiral construction was 8.5 cm in diameter (7 cm high), and the outer surface was the cation exchange layer. The top and bottom ends were sealed with Elvax 4310 adhesive (DuPont) and a polyethylene cap to form a cartridge having three evenly separated openings on the inner and outer surfaces (approximately 120° apart). One cap on each cartridge had a 1 cm diameter hole to provide access to the center of the spiraled water-splitting membranes.

Each cartridge was installed in a tubular plexiglass housing having an inside diameter of 4.00 inches (0.25 inch wall) and a length of 8 cm. One end of each plexiglass tube was sealed with an 0.25 inch thick, 4.5 inch diameter plexiglass sheet. A hole having a one-eighth inch pipe thread was formed in the center of a second plexiglass sheet of the same dimensions as the first, and the cartridge end-cap with the hole was then sealed to the plexiglass lid using Elvax 4310, taking care to align the end-cap and plexiglass holes. Into the threaded hole of the plexiglass sheet was placed a polypropylene fitting having a central electrode (proprietary catalyst on 2 mm titanium; Electrode Corporation) and an opening for solution flow. A hole having a one-eighth inch pipe thread was provided on the housing wall as the second opening to the cartridge. On the interior wall of the housing was attached an expanded mesh electrode (proprietary catalyst on titanium; Electrode Corporation). For both cells, solution flowed from the outer to the inner surface in the first two cartridges, and from the inner to the outer surface in the third cartridge. Each of the three cartridges in the two cells was powered at 127 V.

A solution stream consisting of 0.90 mM CaCl₂ and 5.0 mM NaCl was pumped into first and second cells at 30 ml/min (for a total flow rate of 60 ml/min). The first cell was freshly regenerated and the second cell was used in a prior experiment as a first cell. The sodium and calcium ion concentrations were measured versus time. In Table 3 are summarized the results for the first and second cells as well as the composition of the combined effluent from the two cells. Throughout the 250 minute operation of the apparatus, the combined effluent comprised at most only 12% of the calcium ion present in the incoming solution (overall from the 15 liters of water treated, 91% of the calcium was removed). At the same time, at least 48% of the sodium ion was removed from solution throughout the cycle (overall, 75% of the sodium was removed from the 15 liters of solution treated). Thus the equivalent ion concentration for the 15 liters treated was reduced by 80% (the initial solution was 6.8 mF, the final solution was 1.3 mF).

TABLE 3

Water Softening Results: Values Reported in % Ions Removed

| Time (min) | Volume (liters) | First Cell Ca⁺² | First Cell Na⁺ | Second Cell Ca⁺² | Second Cell Na⁺ | Apparatus Ca⁺² | Apparatus Na⁺ |
| --- | --- | --- | --- | --- | --- | --- | --- |
| 25 | 1.5 | 81% | 82% | 95% | 85% | 88% | 83% |
| 50 | 3.0 | 90% | 95% | 94% | 79% | 92% | 87% |
| 75 | 4.5 | 92% | 99% | 94% | 71% | 93% | 85% |
| 100 | 6.0 | 93% | 98% | 93% | 62% | 93% | 80% |
| 125 | 7.5 | 94% | 98% | 93% | 53% | 93% | 75% |
| 150 | 9.0 | 94% | 97% | 91% | 43% | 93% | 71% |
| 175 | 10.5 | 95% | 96% | 90% | 35% | 92% | 66% |
| 200 | 12.0 | 95% | 95% | 88% | 26% | 92% | 60% |
| 225 | 13.5 | 95% | 92% | 86% | 16% | 91% | 54% |
| 250 | 15.0 | 95% | 88% | 83% | 7% | 89% | 48% |

The present invention has been described in considerable detail with reference to certain preferred versions thereof, however, other versions are possible. Therefore the spirit and scope of the appended claims should not be limited to the description of the preferred versions contained herein.

What is claimed is:

1. An electrochemical cell capable of removing ions from a solution stream, the cell comprising:
   (a) a housing having first and second electrodes;
   (b) at least one water-splitting ion exchange membrane positioned between the electrodes, the water-splitting membrane comprising (i) a cation exchange surface facing the first electrode, and (ii) an anion exchange surface facing the second electrode; and
   (c) a solution stream pathway defined by the water-splitting membrane, the solution stream pathway having (i) an inlet for influent solution stream, (ii) at least one channel that allows influent solution stream to flow past at least one surface of the water-splitting membrane to form one or more treated solution streams, and (iii) a single outlet that combines the treated solution streams to form a single effluent solution.

2. The electrochemical cell of claim 1, wherein the solution stream pathway comprises a unitary and contiguous solution channel that flows past both the cation and anion exchange surfaces of the water-splitting membrane.

3. The electrochemical cell of claim 2 wherein the solution stream pathway comprises an unitary and contiguous solution channel that is connected throughout in an unbroken sequence and extends substantially continuously from the inlet to the outlet.

4. The electrochemical cell of claim 1 comprising substantially no monopolar ion exchange membranes.

5. The electrochemical cell of claim 1 comprising a plurality of water-splitting membranes, and wherein the solution stream pathway comprises a unitary and contiguous solution channel that flows past (i) the electrodes, and (ii) both the cation and anion exchange surfaces of each water-splitting membrane.

6. The electrochemical cell of claim 1 comprising a plurality of water-splitting membranes, and wherein the solution stream pathway comprises a plurality of channels, each channel allowing the influent solution to flow past cation and anion exchange surfaces of adjacent water-splitting membranes.

7. The electrochemical cell of claim 6, comprising substantially no monopolar ion exchange membranes between the adjacent water-splitting membranes.

8. The electrochemical cell of claim 1, comprising a plurality of interdigited water-splitting membranes having alternating ends attached to the housing.

9. The electrochemical cell of claim 1, wherein (i) the water-splitting membranes are rolled in a spiral arrangement to form a cylindrical shape, and (ii) the first or second electrode comprises a cylinder enclosing the spiral arrangement of water-splitting membranes.

10. The electrochemical cell of claim 9, wherein the solution stream pathway allows the influent solution stream to flow past both the cation and anion exchange layer surfaces of the water-splitting membranes in the direction of the spiral.

11. The electrochemical cell of claim 1, wherein the water-splitting membrane comprises at least one of the following characteristics:
   (a) a cation exchange surface comprising a chemical group selected from the group consisting of —SO₃M, —COOM, —PO₃M₂, —C₆H₄OM, aliphatic amines, aromatic amines, aliphatic phosphines, aromatic phosphines, aliphatic sulfides, aromatic sulfides, aminophosphoric acid, aminocarboxylic acid, hydroxamic acid, and mixtures thereof, where M is a cation;
   (b) an anion exchange surface comprising a chemical group selected from the group consisting of aliphatic amines, aromatic amines, aliphatic phosphines, aromatic phosphines, aliphatic sulfides, aromatic sulfides, and mixtures thereof;
   (c) at least one exchange surface of each water-splitting membrane comprises an average pore size of at least about 1 micron;
   (d) at least one exchange surface of each water-splitting membrane comprises a pore volume of at least 10 volume %; or
   (e) the membranes are heterogeneous and comprise cross-linked water-swellable polymeric host material.

12. The electrochemical cell of claim 1, wherein the cation exchange surfaces of the water-splitting membranes comprise at least two cation exchange layers each comprising different cationic chemical groups.

13. The electrochemical cell of claim 12, wherein an inner cation exchange layer comprises SO₃⁻ chemical groups, and an outer cation exchange layer comprises an ion exchange chemical group other than SO₃⁻.

14. The electrochemical cell of claim 1, wherein the anion exchange surfaces of the water-splitting membranes comprise at least two anion exchange layers each comprising different cationic chemical groups.

15. The electrochemical cell of claim 14, wherein an inner anion exchange layer comprises NR₃⁺ groups, and an outer anion exchange layer comprises ion exchange groups other than $NR_3^+$, where R is selected from the group consisting of aliphatic hydrocarbons, aliphatic alcohols, and aromatic hydrocarbons.

16. An electrochemical ion exchange system comprising:
(a) the electrochemical cell of claim 1;
(b) a voltage supply for supplying a voltage to the first and second electrodes; and
(c) means for flowing an influent solution stream through the cell.

17. The electrochemical ion exchange system of claim 16, wherein the water-splitting membranes are positioned so that an electric field generated by the electrodes upon application of a voltage by the voltage supply is directed substantially transverse to the anion and cation exchange surfaces of the water-splitting membranes.

18. An electrochemical cell capable of removing ions from a solution stream, the cell comprising:
(a) a housing having first and second electrodes;
(b) at least one water-splitting ion exchange membrane positioned between the electrodes, the water-splitting membrane comprising (i) a cation exchange surface facing the first electrode, and (ii) an anion exchange surface facing the second electrode; and
(c) a unitary and contiguous solution channel that allows an influent solution stream to flow past (i) the electrodes, and (ii) both the cation and anion exchange surfaces of the water-splitting membrane.

19. The electrochemical cell of claim 18 wherein the unitary and contiguous solution channel is connected throughout in an unbroken sequence and extends substantially continuously from an inlet to an outlet of the housing.

20. The electrochemical cell of claim 18 comprising substantially no monopolar ion exchange membranes.

21. The electrochemical cell of claim 18 comprising a plurality of water-splitting membranes.

22. The electrochemical cell of claim 18, wherein the water-splitting membranes are interdigited with alternating ends attached to the housing.

23. The electrochemical cell of claim 18, wherein (i) the water-splitting membranes are rolled in a spiral arrangement to form a cylindrical shape, and (ii) the first or second electrode comprises a cylinder enclosing the spiral arrangement of water-splitting membranes.

24. The electrochemical cell of claim 18, wherein the water-splitting membrane comprises at least one of the following characteristics:
(a) a cation exchange surface comprising a chemical group selected from the group consisting of —$SO_3M$, —COOM, —$PO_3M_2$, —$C_6H_4OM$, aliphatic amines, aromatic amines, aliphatic phosphines, aromatic phosphines, aliphatic sulfides, aromatic sulfides, aminophosphoric acid, aminocarboxylic acid, hydroxamic acid, and mixtures thereof, where M is a cation;
(b) an anion exchange surface comprising a chemical group selected from the group consisting of aliphatic amines, aromatic amines, aliphatic phosphines, aromatic phosphines, aliphatic sulfides, aromatic sulfides, and mixtures thereof;
(c) at least one exchange surface of each water-splitting membrane comprises an average pore size of at least about 1 micron;
(d) at least one exchange surface of each water-splitting membrane comprises a pore volume of at least 10 volume %; or
(e) the membranes are heterogeneous and comprise crosslinked water-swellable polymeric host material.

25. An electrochemical ion exchange system comprising:
(a) the electrochemical cell of claim 18;
(b) a voltage supply for supplying a voltage to the first and second electrodes; and
(c) means for flowing the influent solution stream through the cell.

26. An assembly of electrochemical cells for selectively removing multivalent ions from a solution, the assembly comprising:
(a) a first electrochemical cell including:
(1) two electrodes,
(2) at least one water-splitting ion exchange membrane between the electrodes, each water-splitting membrane comprising a cation exchange surface facing the first electrode, and an anion exchange surface facing the second electrode, and
(3) a first solution stream pathway having (i) an inlet for influent solution stream, (ii) at least one channel that allows influent solution stream to flow past at least one surface of the water-splitting membrane to form one or more treated solution streams, and (iii) a single outlet that combines the treated solution streams to form a first effluent solution;
(b) at least one second electrochemical cell comprising
(1) two electrodes,
(2) at least one water-splitting ion exchange membrane between the electrodes, each water-splitting membrane comprising a cation exchange surface facing the first electrode, and an anion exchange surface facing the second electrode, and
(3) a second solution stream pathway having (i) an inlet for influent solution stream, (ii) at least one channel that allows influent solution stream to flow past at least one surface of the water-splitting membrane to form one or more treated solution streams, and (iii) a single outlet that combines the treated solution streams to form a second effluent solution;
(c) means for supplying a voltage to the electrodes of the first and second cells; and
(d) a flow controller for apportioning a flow of a solution stream into the first and second cells so that the solution stream flows into the first cell at a first flow rate and into the second cell at a second flow rate, the first and second flow rates being selected to provide a desired concentration of multivalent ions in the combined first and second effluent solutions.

27. The assembly of claim 26, wherein the first and second cells comprise substantially no monopolar ion exchange membranes.

28. The assembly of claim 26, wherein in both cells the water-splitting membranes are arranged to allow the solution stream pathways therein to flow past both the cation and anion exchange surfaces in each cell.

29. The assembly of claim 26, wherein at least a portion of the solution stream pathway in each cell is simultaneously exposed to a cation and anion exchange surface.

30. The assembly of claim 26, wherein the equivalent ion concentration of the second effluent solution is at least twice that of the first effluent solution.

31. The assembly of claim 26, wherein the first cell removes monovalent and multivalent ions from the influent solution stream and the second cell preferentially removes multivalent ions from the influent solution stream.

32. The assembly of claim 26, wherein the average equivalent ion concentration of first effluent solution is less than 50% that of the influent solution.

33. The assembly of claim 26, wherein the average multivalent ion concentration of the second effluent solution is less than 50% that of the influent solution.

34. The assembly of claim 26, wherein the flow rates of the influent solution streams apportioned through the first and second cells are selected to provide a predetermined composition of ions in the combined effluent solution.

35. The assembly of claim 26, further wherein the flow controller apportions the solution stream to the first and second cells such that at least 10 volume % of the solution stream flows through one of the cells.

36. The assembly of claim 26, further comprising an ion meter for (i) measuring the concentration of ions in the first and second effluent solutions, (ii) generating an output signal proportional to the measured ion concentrations, and (iii) feeding the signal to the flow controller, and wherein the flow controller apportions the influent solution stream to the first and second cells in response to the output signal to control the ion concentration in the combined effluent solutions.

37. The assembly of claim 26, further comprising a third electrochemical cell including (i) first and second electrodes, (ii) at least one water-splitting membrane between the electrodes, (iii) means for flowing a second influent solution stream through the third cell independent of the influent solution stream passing through the first and second cells, and (iv) means for reversing the polarity of the first and second electrodes of the third cell, wherein the third cell is regenerated to substantially the condition of the first cell.

38. A method of replacing ions in an ion exchange material by applying a voltage to an electrochemical cell comprising:

(a) first and second electrodes;
(b) at least one water-splitting membrane between the electrodes, each water-splitting membrane comprising ion exchange layers A and B, one a cation exchange layer facing the first electrode and the other an anion exchange layer facing the second electrode, which layers contain ions $I_{1A}$ and $I_{1B}$ respectively;
   wherein a unitary and contiguous solution channel is defined by the cation and anion exchange layer surfaces of the membranes, the solution channel abutting both electrodes and extending continuously from the inlet to the outlet of the housing;
(c) an ion-containing solution electrically connecting the electrodes and the water-splitting membranes;
in which cell ions $I_{1A}$ and $I_{1B}$ are replaced by ions $I_{2A}$ and $I_{2B}$, respectively.

39. The method of claim 38 wherein the cell comprises substantially no monopolar ion exchange membranes.

40. The method of claim 38 wherein the water-splitting membranes are arranged to provide a continuous channel that allows a stream of solution to flow past both the cation and anion exchange layer surfaces of the water-splitting membranes.

41. The method of claim 38 wherein the solution in at least one channel of the cell is simultaneously exposed to a cation and an anion exchange layer surface of water-splitting membranes.

42. The method of claim 38 wherein $H^+$ and $OH^-$ are produced within the water-splitting membranes and pass through ion exchange layers A and B, respectively, causing ions $I_{1A}$ and $I_{1B}$ to be replaced by ions $I_{2A}$ and $I_{2B}$ respectively.

43. The method of claim 42 wherein the polarities of ions $I_{1A}$ and $I_{1B}$ are the same as those of the $H^+$ and $OH^-$ ions causing their replacement.

44. The method of claim 42 wherein the polarities of ions $I_{1A}$ and $I_{1B}$ are opposite those of the $H^+$ and $OH^-$ ions causing their replacement.

45. The method of claim 38 comprising the additional step of reversing the polarity of the electrodes causing ions $I_{2A}$ and $I_{2B}$ to be replaced by ions $I_{3A}$ and $I_{3B}$, respectively.

46. The method of claim 45 wherein in the reversing step, the $OH^-$ and $H^+$ are produced within the water-splitting membranes and pass through ion exchange layers A and B, respectively, causing ions $I_{2A}$ and $I_{2B}$ to be replaced by ions $I_{3A}$ and $I_{3B}$, respectively.

47. The method of claim 45 comprising the additional step of terminating the current, causing ions $I_{2A}$ and $I_{2B}$ to be replaced by ions $I_{3A}$ and $I_{3B}$, respectively.

48. A method for removing multivalent ions from a solution, which method comprises applying a voltage to an assembly comprising first and second electrochemical cells:

(a) the first electrochemical cell comprising:
   (i) first and second electrodes;
   (ii) at least one water-splitting membrane between the electrodes, each water-splitting membrane comprising a cation exchange layer A and an anion exchange layer B, which layers comprise ions $I_{4A}$ and $I_{4B}$, respectively, ions $I_{4A}$ and $I_{4B}$ comprising substantially $H^+$ and $OH^-$, respectively, wherein the cation exchange layers face the first electrode and the anion exchange layers face the second electrode, in which cell there is a unitary and contiguous solution channel, and
   (iii) a solution containing ions $I_{2A}$ and $I_{2B}$ which electrically connects the electrodes and water-splitting membrane, in which cell ions $I_{4A}$ and $I_{4B}$ are replaced by ions $I_{2A}$ and $I_{2B}$;

(b) a second electrochemical cell, comprising:
   (i) first and second electrodes;
   (ii) at least one water-splitting membrane arranged between the electrodes, each water-splitting membrane comprising a cation exchange layer A and an anion exchange layer B, which layers comprise ions $I_{5A}$ and $I_{5B}$, respectively, ions $I_{5A}$ and $I_{1B}$ comprising monovalent ions other than $H^+$ and $OH^-$, respectively, wherein the cation exchange layers face the first electrode and the anion exchange layers face the second electrode, in which cell there is a unitary and contiguous solution channel, and
   (iii) a solution containing ions $I_{2A}$ and $I_{2B}$ which electrically connects the electrodes and water-splitting membrane,
   in which cell ions $I_{5A}$ and $I_{5B}$ are replaced by ions $I_{2A}$ and $I_{2B}$, respectively.

49. The method of claim 48 wherein each cell comprises substantially no monopolar ion exchange membranes.

50. The method of claim 48 wherein a calcium ion concentration of a first effluent solution from the first cell is reduced by at least 60% and a calcium ion concentration of a second effluent solution from the second cell is reduced by at least 50%.

51. The method of claim 48 comprising the additional step of introducing another solution into the second electrochemical cell and reversing the polarity of the electrodes causing ions $I_{2A}$ and $I_{2B}$ to be replaced by ions $I_{4A}$ and $I_{4B}$, respectively.

52. The method of claim 48 wherein in both cells the water-splitting membranes are arranged to provide a continuous solution stream in each cell which flows past both the cation and anion exchange layer surfaces of their water-splitting membranes.

53. The method of claim 48 wherein the solution in at least one channel of the first and second cells is simultaneously exposed to a cation and an anion exchange layer surface of water-splitting membranes.

54. The method of claim 48 wherein the step of flowing a solution stream through the first and second cells includes the step of controlling the flow rates of the solution through the first and second cells to obtain a predetermined concentration of ions in the effluent streams from the cells.

55. The method of claim 48 wherein the step of controlling the flow rates of the solution through the first and second cells to obtain a predetermined concentration of ions in effluent streams from the cells includes the step of monitoring the composition of the effluent streams from the first and second cells, and adjusting the flow rates of the solution through the first and second cells in relation to the composition of the effluent streams.

56. The method of claim 48 comprising a third electrochemical cell comprising:

(a) first and second electrodes;

(b) at least one water-splitting membrane arranged between the electrodes, each water-splitting membrane comprising a combination of a cation exchange layer A and an anion exchange layer B, which layers comprise ions $I_{2A}$ and $I_{2B}$, wherein the cation exchange layers face the first electrode and the anion exchange layers face the second electrode, in which cell there is a unitary and contiguous solution stream, and (c) a solution which electrically connects the electrodes and water-splitting membranes, wherein the polarity of the first and second electrodes in the third cell is reversed relative to that for the first and second cells, such that in the third cell ions $I_{2A}$ and $I_{2B}$ are replaced by ions $I_{4A}$ and $I_{4B}$, respectively.

57. The method of claim 56 wherein the replacement of ions $I_{2A}$ and $I_{2B}$ by ions $I_{4A}$ and $I_{4B}$, respectively, in the third cell occurs while the first and second cells are removing multivalent ions from their separate solution stream.

* * * * *